(12) United States Patent
Noh et al.

(10) Patent No.: US 12,040,862 B2
(45) Date of Patent: Jul. 16, 2024

(54) DEVICE AND METHOD FOR PERFORMING CHANNEL SELECTION IN WIRELESS AV SYSTEM

(71) Applicant: LG ELECTRONICS INC., Seoul (KR)

(72) Inventors: Jungho Noh, Seoul (KR); Jinmin Kim, Seoul (KR); Jaewook Song, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 358 days.

(21) Appl. No.: 17/597,595

(22) PCT Filed: Jul. 16, 2019

(86) PCT No.: PCT/KR2019/008784
§ 371 (c)(1),
(2) Date: Jan. 12, 2022

(87) PCT Pub. No.: WO2021/010516
PCT Pub. Date: Jan. 21, 2021

(65) Prior Publication Data
US 2022/0255601 A1    Aug. 11, 2022

(51) Int. Cl.
*H04B 7/06* (2006.01)
*H04L 1/00* (2006.01)
(Continued)

(52) U.S. Cl.
CPC ......... *H04B 7/0617* (2013.01); *H04B 7/0695* (2013.01); *H04L 1/0003* (2013.01); *H04W 16/28* (2013.01); *H04W 24/08* (2013.01)

(58) Field of Classification Search
CPC .... H04B 7/0617; H04B 7/0695; H04B 7/088; H04L 1/0003; H04L 1/0009;
(Continued)

(56) References Cited

U.S. PATENT DOCUMENTS 8,892,722 B1 * 11/2014 Kopikare ............ H04L 67/1061
709/224
11,553,481 B2 * 1/2023 Brown .................. H04W 12/04
(Continued)

FOREIGN PATENT DOCUMENTS

KR    1020060063409    6/2006
KR     100677216       2/2007
(Continued)

OTHER PUBLICATIONS

PCT International Application No. PCT/KR2019/008784, International Search Report dated Apr. 13, 2020, 3 pages.

*Primary Examiner* — Hashim S Bhatti
(74) *Attorney, Agent, or Firm* — LEE, HONG, DEGERMAN, KANG & WAIMEY

(57) ABSTRACT

The present invention relates to a device and a method for performing channel selection in a wireless AV system. Such present specification discloses a wireless data transmission device for performing channel selection, the device comprising: a communication unit for performing the steps of selecting an initial channel in a non-connection state on the basis of first channel monitoring, transmitting a periodic beacon onto the initial channel in a standby mode after switching to a connection state, and selecting a new channel in the standby mode on the basis of second channel monitoring in an interval in which beacon transmission does not occur; and a processor connected to the communication unit so as to control the operation of the communication unit. Fast and economic channel selection appropriate for the wireless AV system is possible.

20 Claims, 13 Drawing Sheets

(51) Int. Cl.
*H04W 16/28* (2009.01)
*H04W 24/08* (2009.01)

(58) Field of Classification Search
CPC .... H04L 1/0025; H04L 1/0026; H04W 16/28; H04W 24/08; H04W 76/27; H04N 21/422; H04N 21/436; H04N 21/4363; H04N 21/438; H04N 21/61
See application file for complete search history.

(56) References Cited

U.S. PATENT DOCUMENTS

| | | | |
|---|---|---|---|
| 2016/0150584 A1* | 5/2016 | Ohta | H04W 52/0216 |
| | | | 370/328 |
| 2016/0165637 A1* | 6/2016 | Kim | H04W 28/18 |
| | | | 370/329 |
| 2018/0007734 A1* | 1/2018 | Kela | H04W 76/28 |
| 2019/0068255 A1 | 2/2019 | Bolotin et al. | |
| 2021/0136708 A1* | 5/2021 | Shang | H04W 56/002 |
| 2022/0311479 A1* | 9/2022 | Ahn | H04B 7/0491 |

FOREIGN PATENT DOCUMENTS

| | | |
|---|---|---|
| KR | 1020070018786 | 2/2007 |
| WO | 2018236694 | 12/2018 |

* cited by examiner

FIG. 3
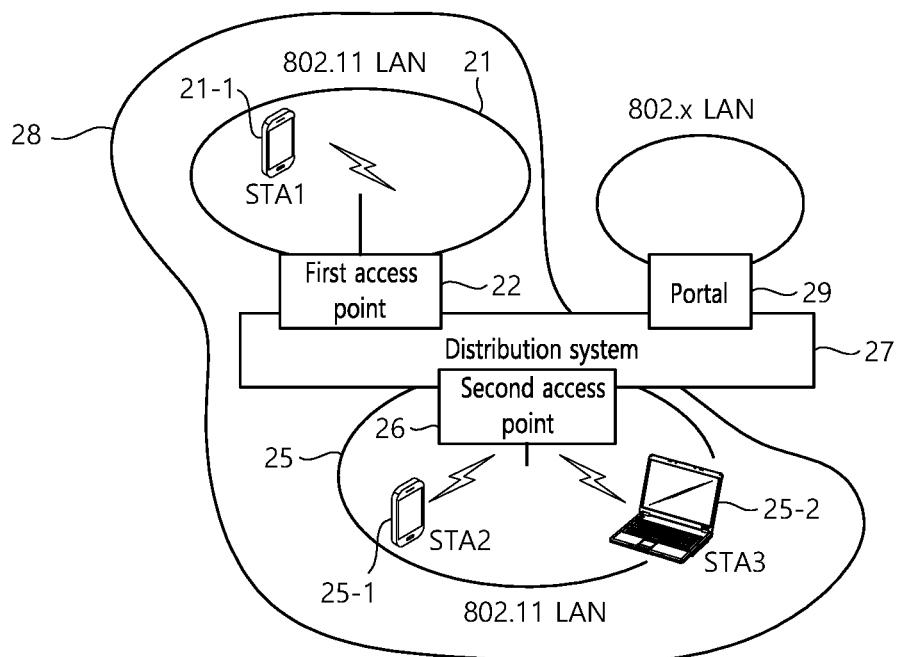
(A)
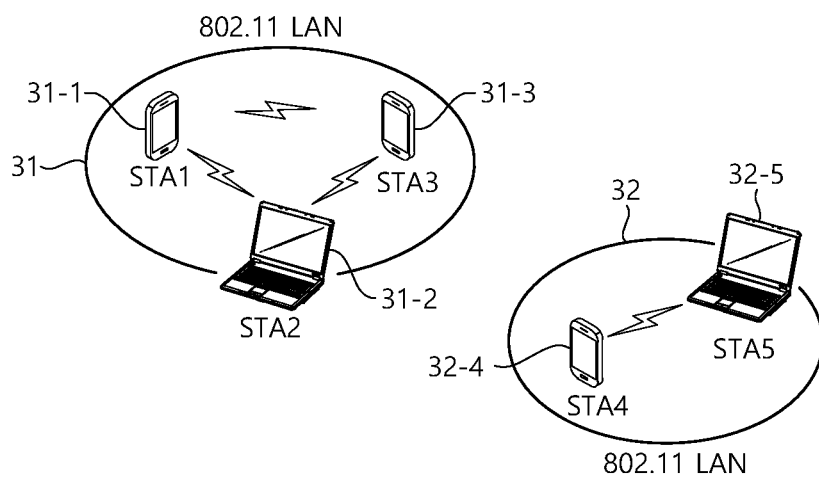
(B)

DEVICE AND METHOD FOR PERFORMING CHANNEL SELECTION IN WIRELESS AV SYSTEM

CROSS-REFERENCE TO RELATED APPLICATIONS

This application is the National Stage filing under 35 U.S.C. 371 of International Application No. PCT/KR2019/008784, filed on Jul. 16, 2019, the contents of which are all incorporated by reference herein in its entirety.

BACKGROUND

Field

The present disclosure relates to a wireless audio/video (AV) system and, more particularly, to a wireless data transmission device, a wireless data transmission method, a wireless data reception device, and a wireless data reception method for performing channel selection a wireless AV system.

Related Art

Recently, there have been growing demands for high-resolution and high-quality images, such as high-definition (HD) images and ultrahigh-definition (UHD) images, in various fields. With the advent of new applications, there is an increasing demand for a technology for wirelessly transmitting a data stream including an audio, a video, a picture, or a combination of at least one thereof. An application field to which this technology can be applied is a wireless audio/video (AV) system.

In a wireless AV system, as video data has a higher resolution and a higher quality, the amount of information or bits to be transmitted increases compared to existing video data. Therefore, research for wirelessly transmitting a large amount of data at a high speed is being conducted. For example, a wireless AV system may transmit or receive a large amount of data based on ultrahigh-speed wireless communication, such as Institute of Electrical and Electronics Engineers (IEEE) 802.11ad or IEEE 802.11ay.

IEEE 802.11ad is an ultrahigh-speed wireless communication standard operating in a band of 60 GHz or higher. The standard provides a signal range of about 10 meters but can support a throughput of more than 6 Gbps. Since the standard operates in a high frequency band, signal propagation is dominated by ray-like propagation. Signal quality may be improved as a transmit (TX) or receive (RX) antenna beam is aligned toward a strong spatial signal path. Currently, IEEE 802.11ay, which is an improved version of IEEE 802.11ad, is under development.

In established standards, such as IEEE 802.11ad or IEEE 802.11ay, multiple access and communication of a plurality of devices are assumed. However, applications of a wireless AV system are designed on the assumption of 1:1 wireless communication (e.g., communication between a wireless set-top box and a wireless display device) in most cases. Therefore, it is necessary to design a communication method unique to an applied technology of the wireless AV system, rather than applying the established standards to the wireless AV system as they are.

In particular, when a channel selection procedure of an established communication standard is applied to a wireless AV system as it is, an unnecessary delay may be entailed. Therefore, there is a need for a method for performing fast and economical channel selection suitable for a wireless AV system.

SUMMARY

A technical aspect of the present disclosure is to provide a wireless data transmission device and a wireless data transmission method for performing channel selection a wireless AV system.

Another technical aspect of the present disclosure is to provide a wireless data reception device and a wireless data reception method for performing channel selection a wireless AV system.

According to one embodiment of the present disclosure, there is provided a wireless data transmission device for performing channel selection in a wireless audio-video (AV) system. The device includes: a communication unit configured to perform a process of selecting an initial channel based on first channel monitoring in a non-connected state, a process of transmitting a periodic beacon on the initial channel in a standby mode after switching to a connected state, and a process of selecting a new channel based on second channel monitoring in a period in which no beacon is transmitted in the standby mode; and a processor connected to the communication unit to control an operation of the communication.

In one aspect, the first channel monitoring and the second channel monitoring may be performed based on a received signal strength or a received channel power indicator (RCPI), and the first channel monitoring may include a process of the communication unit monitoring a plurality of channels according to a predefined order based on BSS initialization and selecting a suitable channel as the initial channel.

In another aspect, the suitable channel may be a best channel among the plurality of channels.

In another aspect, the process of monitoring according to the predefined order may include a process of sequentially monitoring non-overlapping channels among the plurality of channels first and then monitoring channels that at least partially overlap the first monitored channels, and the suitable channel may be a channel satisfying a channel requirement among the plurality of channels.

In another aspect, when the communication unit switches from the connected state to the non-connected state, the communication unit may transmit the periodic beacon on a preferred channel according to the second channel monitoring, and the communication unit may perform the first channel monitoring when failing to receive a response to at least n beacons from a wireless data reception device.

In another aspect, the process of selecting the new channel may include a process of the communication unit transmitting channel switching request information to a wireless data reception device based on the second channel monitoring, a process of receiving channel switching response information from the wireless data reception device, and a process of switching to the new channel.

In another aspect, the process of selecting the new channel may include a process of the communication unit receiving information on third channel monitoring by a wireless data reception device from the wireless data reception device, a process of the communication unit transmitting channel switching request information to the wireless data reception device based on the second channel monitoring and the information on the third channel monitoring, a process of receiving channel switching response information from the wireless data reception device, and a process of switching to the new channel.

In another aspect, the process of selecting the new channel may include a process of transmitting a first EDMG PPDU for selecting a modulation and coding scheme (MCS) in a first direction to a wireless data reception device on a currently connected channel, a process of receiving a second EDMG PPDU for selecting a MCS in a second direction from the wireless data reception device on the currently connected channel, a process of receiving MCS information selected based on the first EDMG PPDU and information on third channel monitoring by the wireless data reception device from the wireless data reception device, and a process of switching to the new channel based on a result of the second channel monitoring and the information on the third channel monitoring.

In another aspect, the first EDMG PPDU and the second EDMG PPDU may be null data and may each include a training (TRN) field at an end thereof, and the communication unit may perform beam maintenance based on the training field.

In another aspect, the first EDMG PPDU and the second EDMG PPDU may be transmitted according to a wake-up period.

According to another embodiment of the present disclosure, there is provided a wireless data reception device for performing a channel scan in a wireless audio-video (AV) system. The device includes: a communication unit configured to perform a process of scanning a plurality of channels in a state of being non-connected with a wireless data transmission device, a process of receiving a beacon on an initial channel selected by the wireless data transmission device, a process of performing channel monitoring in a period in which the beacon is not transmitted in a standby mode after switching to a connected state, a process of transmitting a result of the channel monitoring to the wireless data transmission device, and a process of switching to a new channel; and a processor connected to the communication unit to control an operation of the communication.

In one aspect, the channel monitoring may be performed based on a received signal strength or a received channel power indicator (RCPI).

In another aspect, the initial channel may be a best channel among the plurality of channels.

In another aspect, the initial channel may be a channel satisfying a channel requirement among the plurality of channels.

In another aspect, when the communication unit switches from the connected state to the non-connected state, if failing to receive a response to at least n beacons from the wireless data transmission device, the communication unit may perform the channel monitoring again.

In another aspect, the process of switching to the new channel may include a process of the communication unit receiving channel switching request information from the wireless data transmission device and a process of transmitting channel switching response information to the wireless data transmission device.

In another aspect, the process of switching to the new channel may include a process of the communication unit transmitting information on the channel monitoring to the wireless data transmission device, a process of receiving channel switching request information from the wireless data transmission device, and a process of transmitting channel switching response information to the wireless data reception device.

In another aspect, the process of switching to the new channel may include a process of receiving a first EDMG PPDU for selecting a modulation and coding scheme (MCS) in a first direction from the wireless data transmission device on a currently connected channel, a process of transmitting a second EDMG PPDU for selecting a MCS in a second direction to the wireless data transmission device on the currently connected channel, and a process of transmitting MCS information selected based on the first EDMG PPDU and information on the channel monitoring to the wireless data transmission device.

In another aspect, the first EDMG PPDU and the second EDMG PPDU may be null data and may each include a training (TRN) field at an end thereof, and the communication unit may perform beam maintenance based on the training field.

In another aspect, the first EDMG PPDU and the second EDMG PPDU may be received according to a wake-up period.

It is possible to quickly and economically select a channel in a wireless AV system.

BRIEF DESCRIPTION OF THE DRAWINGS

FIG. 3 is a conceptual diagram of a case where the wireless data transceiving system according to an embodiment is implemented according to an IEEE 802.11 series communication protocol.

DESCRIPTION OF EXEMPLARY EMBODIMENTS

Figure 1:
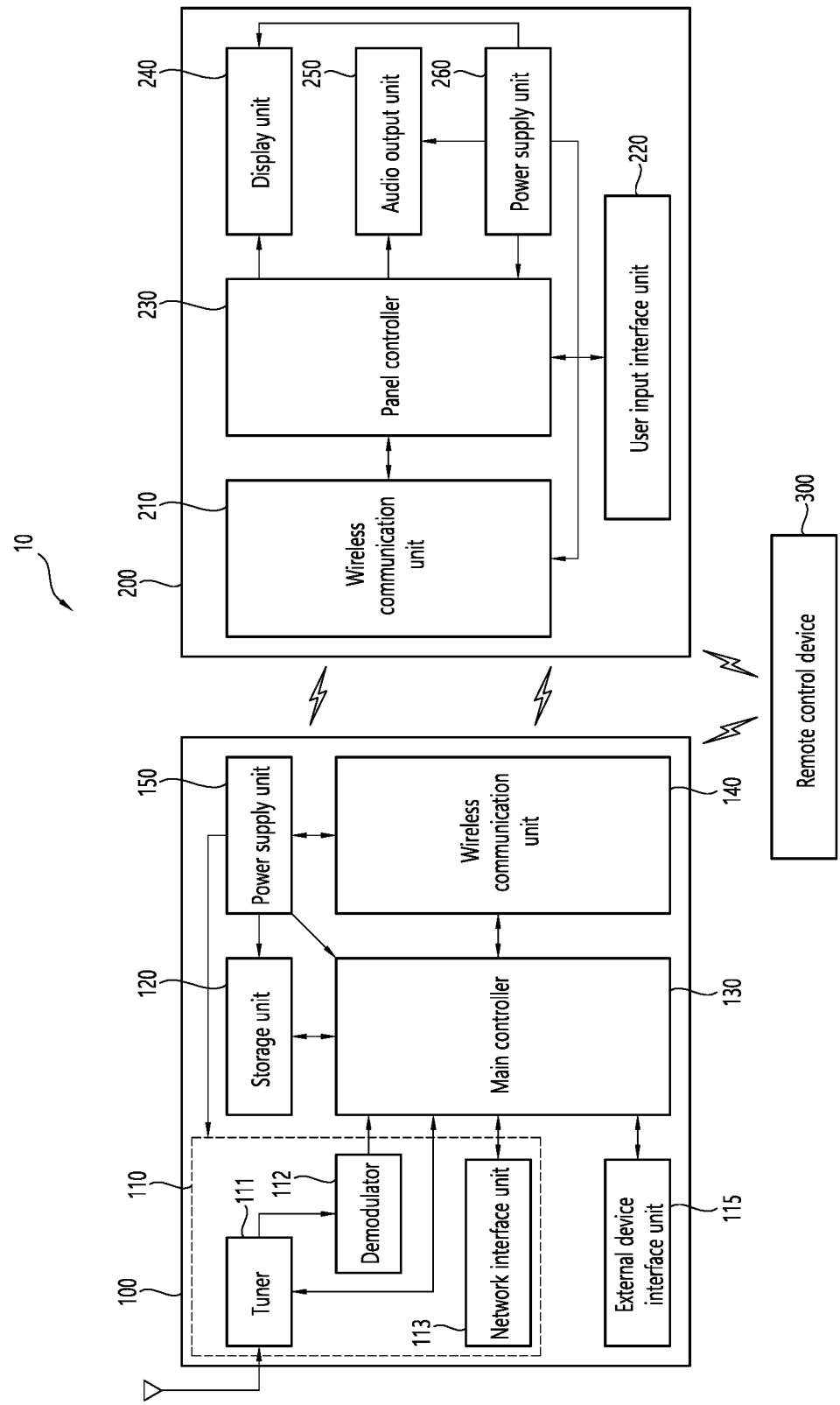
FIG. 1 is a block diagram of a wireless AV system according to an embodiment.

The following detailed description illustrates embodiments of a device and method for transmitting wireless data and embodiments of a device and method for receiving wireless data that are provided according to the present disclosure. And, such embodiments do not represent the only forms of the present disclosure. The characteristics and features of the present disclosure are described with reference to exemplary embodiments presented herein. However, functions and structures that are similar or equivalent to those of the exemplary embodiments described in the present specification may be included in the scope and spirit of the present disclosure and may be achieved by other intended embodiments. Throughout the present specification, similar reference numerals will be used to refer to similar components or features. Hereinafter, embodiments of the present disclosure will be described in detail with reference to the accompanying drawings.

In recent years, the design of display devices, such as TVs, has become important, and display panels have become thinner with the development and evolution of technologies for display panels, such as OLED. However, due to the thickness of a driving circuit that is required in order to drive a display panel, there have been restrictions (or limitations) in manufacturing and designing thinner display panels. Therefore, a technology that is capable of separating components excluding components that are mandatorily required to be physically and electrically connected to the display panel, from the display panel, and equipping the physically or electrically separated components to a separate device (hereinafter referred to as a "main device") is being considered as a promising technology. In this case, a main device and a display device may be configured to exchange image signals and audio signals based on a wireless communication between the main device and the display device. The present disclosure relates to a wireless AV system, or a wireless display system being equipped with a main device and a display device that are provided as physically and/or electrically independent components, wherein media may be played (or reproduced) based on a wireless communication between the devices.

FIG. 1 is a block diagram of a wireless AV system according to an embodiment of the present disclosure.

Referring to FIG. 1, a wireless AV system 10 may include a main device 10, a display panel device 200, and a remote control device 300.

The main device 100 may perform an operation of receiving an external signal in a wired or wireless format that is related to audio, video, pictures, images, multimedia, or at least one combination thereof, processing the received external signal by using various methods, so as to generate a data stream or a bitstream, and transmitting the generated data stream or bitstream to the display device 200.

In order to perform such operation, the main device 100 may include an external signal receiver 110, an external device interface unit 115, a storage unit 120, a main controller 130, a wireless communication unit 140, and a power supply unit 150.

The external signal receiver 110 may include a tuner 111, a demodulator 112, and a network interface unit 113.

The tuner 111 receives an external signal in a wired or wireless format that is related to audio, video, pictures, images, multimedia, or at least one combination thereof. For example, the tuner 111 may select a specific broadcast channel in accordance with a channel selection command and may receive a broadcast signal corresponding to the selected specific broadcast channel.

The demodulator 112 may separate the received broadcast signal to a video signal, an image signal, a picture signal, an audio signal, and a data signal related to a broadcast program. And, then, the demodulator 112 may reconstruct (or restore or recover) the separated video signal, image signal, picture signal, audio signal, and data signal to a format that can be outputted.

The external device interface unit 115 may receive an application or an application list of a nearby (or neighboring) external device and may deliver (or communicate) the application or application list to the main controller 130 or storage unit 120.

The external device interface unit 115 may provide a connection path between the wireless AV system 100 and an external device. The external device interface unit 115 may receive an external input signal including audio, video, pictures, images, multimedia, or at least one combination thereof from an external device, which is connected to the main device 100 via wired or wireless connection, and may then deliver the received external input signal to the main controller 130. The external device interface unit 115 may include multiple external input terminals. The multiple external input terminals may include an RF terminal, an RGB terminal, one or more High Definition Multimedia Interface (HDMI) terminals, a USB terminal, a component terminal, an AV terminal, a CI terminal.

An external device that is connectable to the external device interface unit 115 may be any one of a set-top box, a Bluray player, a DVD player, a gaming system, a sound bar, a smart phone, a PC, a USB memory, a home theater system. However, these are merely exemplary.

The network interface unit 113 may provide an interface for connecting the main device 100 to a wired/wireless network including an internet network. The network interface unit 113 may transmit or receive data to or from another user or another electronic device through an accessed network or another network that is linked to the accessed network.

Additionally, some content data stored in the main device 100 may be transmitted to a user or an electronic device, which is selected from other users or other electronic devices that are pre-registered in the main device 100.

The network interface unit 113 may access a predetermined webpage through an accessed network or another network that is linked to the accessed network. That is, the network interface unit 113 may transmit or receive data to or from a corresponding server by accessing a predetermined webpage through the network.

Also, the network interface unit 113 may receive contents or data provided from a content provider or a network operator. That is, the network interface unit 113 may receive contents such as movies, advertisements, games, VODs, and broadcast signals, which are provided from a content provider or a network provider, and related information through the network.

Additionally, the network interface unit 113 may receive firmware update information and update files provided from a network operator and may transmit data to an internet or content provider or a network operator.

The network interface unit 113 may select and receive a wanted application among applications that are open to public, through the network.

The storage unit 120 may store programs for performing processing and control of each signal within the main controller 130, and then the storage unit 120 may store signal-processed image, voice, or data signals.

Additionally, the storage unit 120 may perform a function for temporarily storing image, voice, or data signals that are inputted from the external device interface unit 115 or network interface unit 113, and the storage unit 120 may also store information related to a predetermined image through a channel memory function.

The storage unit 120 may store an application or an application list that is inputted from the external device interface unit 115 or network interface unit 113.

The main controller 130 may control the main device 100 by using a user instruction (or command) that is inputted through the remote control device 300, or by using an internal program, and may access a network in order to be capable of downloading an application or an application list that is wanted by a user to the main device 100.

The main controller 130 enables user-selected channel information to be outputted along with a processed image or audio signal through a display device 200 or an audio output unit 250.

Additionally, the main controller 130 enables an image signal or audio signal, which is inputted from an external device, e.g., a camera or camcorder, through the external device interface unit 115, to be outputted through the display device 200 or audio output unit 250 in accordance with according to an external device image playback instruction (or command) that is received through the remote control device 300.

The main controller 130 may perform a control operation so that content stored in the storage unit 120, received broadcast content, or externally input content can be played back (or reproduced). Such content may be configured in various formats, such as a broadcast image, an externally inputted image, an audio file, a still image, an accessed (or connected) web screen, a document file, and so on.

The main controller 130 may decode a video, an image, a picture, a sound, or data related to a broadcast program being inputted through the demodulator 112, the external device interface unit 115, or the storage unit 120. Then, the main controller 130 may process the decoded data in accordance with encoding/decoding methods supported by the display device 200. Thereafter, the main controller 130 may process the encoded data by using various video/audio processing methods, such as compression and encoding, so as to transmit the corresponding data through a wireless channel, thereby generating a data stream or bitstream. Finally, the main controller 130 may transmit the generated data stream or bitstream to the display device 200 through the wireless communication unit 140. Depending upon the embodiments, the main controller 130 may also bypass the decoded data, without encoding the decoded data in accordance with the encoding/decoding methods supported by the display device 200, and may directly transmit the decoded data to the display device 200 through the wireless communication unit 140.

The main controller 130 may be configured to implement the functions, procedures, and/or methods of a processor 1130 of a wireless data transmission device 1100 that are to be described with reference to each embodiment of the present specification. Layers of the wireless interface protocol may be implemented in the processor 1130.

The wireless communication unit 140 may be operatively coupled to the main controller 130, for example, as a combination of a wireless communication chip and an RF antenna. The wireless communication unit 140 may receive a data stream or bitstream from the main controller 130, may generate a wireless stream by encoding and/or modulating the data stream or bitstream into a format that can be transmitted through a wireless channel, and may transmit the generated wireless stream to the display device 200. The wireless communication unit 140 establishes a wireless link, and the main device 100 and the display device 200 are connected through the wireless link. The wireless communication unit 140 may be configured based on various wireless communication modes, such as short-range wireless communication including Wi-Fi, Bluetooth, NFC, and RFID, or a mobile communication network (e.g., 3G, 4G, and 5G cellular networks). For example, the wireless communication unit 140 may perform communication by using a communication protocol, such as a standard of the IEEE 802.11 series.

The power supply unit 150 supplies power to the external signal receiver 110, the external device interface unit 115, the storage unit 120, the main controller 130, and the wireless communication unit 140. Methods for receiving power from an external source performed by the power supply unit 150 may include a terminal method and a wireless method. In case the power supply unit 150 receives power by using a wireless method, the power supply unit 150 may include a separate configuration in order to wirelessly receive power. For example, the power supply unit 150 may include a power pick-up unit configured to be magnetically coupled with an external wireless power transmission device so as to receive wireless power, and a separate communication and control unit configured to perform communication with the wireless power transmission device in order to receive wireless power and to control transmission and reception of wireless power.

The wireless communication unit 140 may also be wirelessly connected to the remote control device 300, thereby being capable of transferring (or delivering) signals inputted by the user to the main controller 130 or transmitter (or delivering) signals from the main controller 130 to the user. For example, the wireless communication unit 140 may receive or process control signals, such as power on/off, screen settings, and so on, of the main device 100 from the remote control device 300 or may process control signals received from the main controller 130 so that the processed signals can be transmitted to the remote control device 300 in accordance with various communication methods, such as Bluetooth, Ultra Wideband (WB), ZigBee, Radio Frequency (RF), or Infrared (IR) communication, and so on.

Additionally, the wireless communication unit 140 may deliver (or communicate) control signals that are inputted from a local key (not shown), such as a power key, a volume key, a setup key, and so on, to the main controller 130.

Subsequently, the display device 200 may process a wireless stream, which is received from the main device 100 through a wireless interface, by performing a reverse process of a signal processing operation that is performed by the main device 100, and, then, the display device 200 may output a display or audio (or sound). In order to perform such operation, the display device 200 may include a wireless communication unit 210, a user input interface unit 220, a panel controller 230, a display unit 240, an audio output unit 250, and a power supply unit 260.

The wireless communication unit 210 may be configured as a combination of a wireless communication chip and an RF antenna. The wireless communication unit 210 is connected to the wireless communication unit 140 of the main device 100 through a wireless link and performs wireless communication with the wireless communication unit 140 of the main device 100. More specifically, the wireless communication unit 210 receives a wireless stream from the wireless communication unit 140 of the main device 100, demodulates the received wireless stream, and transmits the demodulated wireless stream to the panel controller 230. The wireless communication unit 210 may be configured based on various wireless communication modes, such as short-range wireless communication including Wi-Fi, Bluetooth, NFC, and RFID, or a mobile communication network (e.g., 3G, 4G, and 5G cellular networks). For example, the wireless communication unit 210 may perform communication by using a communication protocol, such as a standard of the IEEE 802.11 series.

The panel controller 230 decodes a signal that is demodulated by the wireless communication unit 210 so as to reconstruct (or recover) a bitstream or data stream. At this point, in case the bitstream or data stream is a compressed stream, the panel controller 230 may decompress or reconstruct the bitstream or data stream. Thereafter, the panel controller 230 may output the bitstream or data stream as a video signal, an image signal, a picture signal, an audio signal, or a data signal related to a broadcast program, and may transmit the signals to the display unit 240, the audio output unit 250, and the user input interface unit 220.

The video signal, the picture signal, the image signal, and so on, that are inputted to the display unit 240 may be displayed as a picture corresponding to the inputted picture signal. Alternatively, the picture signal that is processed by the panel controller 230 may be transmitted back to the main device 100 through the wireless communication unit 210 and may then be inputted to an external output device through the external device interface unit 115 of the main device 100.

The audio signal that is processed by the panel controller 230 may be audio-outputted to the audio output unit 250. Moreover, the audio signal that is processed by the panel controller 230 may be transmitted back to the main device 100 through the wireless communication unit 210 and may then be inputted to an external output device through the external device interface unit 115 of the main device 100.

Meanwhile, the panel controller 230 may control the display unit 240 so as to display a picture (or image). For example, the panel controller 230 may perform control operation, so that a broadcast picture (or image) that is inputted through the tuner 111, an externally inputted picture (or image) that is inputted through the external device interface unit 115, a picture (or image) that is inputted through the network interface unit, or a picture (or image) that is stored in the storage unit 120 can be displayed on the display unit 240. In this case, the picture (or image) that is displayed on the display unit 240 may be a still picture (or image) or a video, and may be a 2D image or a 3D image.

The panel controller 230 may be configured to implement the functions, procedures, and/or methods of a processor 1230 included in a wireless data reception device 1200, which will be described with reference to each embodiment of the present specification. Additionally, the processor 1230 may be configured to implement the functions, procedures, and/or methods of the wireless data receiving 1200 that will be described with reference to each embodiment of the present specification.

The user input interface unit 220 may transmit a signal that is inputted, by the user, to the panel controller 230 or may transmit a signal from the panel controller 230 to the user. For example, the user input interface 220 may receive and process control signals, such as power on/off, screen settings, and so on, of the display device 200 from the remote control device 300, or may process control signals received from the panel controller 230 so that the processed signals can be transmitted to the remote control device 300 in accordance with various communication methods, such as Bluetooth, Ultra Wideband (WB), ZigBee, Radio Frequency (RF), or Infrared (IR) communication, and so on.

The user input interface unit 220 may transmit a control signal, which is inputted through a local key (not shown), such as a power key, a volume key, a setup key, and so on, to the panel controller 230.

The power supply unit 260 supplies power to the wireless communication unit 210, the user input interface unit 220, the panel controller 230, the display unit 240, and the audio output unit 250. Methods for receiving power from an external source performed by the power supply unit 260 may include a terminal method and a wireless method. In case the power supply unit 260 receives power by using a wireless method, the power supply unit 260 may include a separate configuration in order to wirelessly receive power. For example, the power supply unit 260 may include a power pick-up unit configured to be magnetically coupled with an external wireless power transmission device so as to receive wireless power, and a separate communication and control unit configured to perform communication with the wireless power transmission device in order to receive wireless power and to control transmission and reception of wireless power.

The remote control device 300 performs an operation of remotely controlling various features of the main device 100 or the display device 200, such as power on/off, channel selection, screen setup, and so on. Herein, the remote control device 300 may also be referred to as a "remote controller (or remote)".

Meanwhile, since the main device 100 and the display device 200, which are shown in FIG. 1, are provided only as an example of one embodiment of the present disclosure, some of the illustrated components may be integrated or omitted, or other components may be added according to the specifications of the main device 100 and the display device 200, which are actually implemented. That is, as necessary, two or more components may be integrated into one component, or one component may be divided into two or more components. In addition, a function that is performed in each block is presented to describe an embodiment of the present disclosure, and a specific operation or device will not limit the scope and spirit of the present disclosure.

According to another embodiment of the present disclosure, unlike the example shown in FIG. 1, the main device 100 may receive and play-back (or reproduce) an image (or picture) through the network interface unit 113 or the external device interface unit 115 without including the tuner 111 and the demodulator 112.

For example, the main device 100 may be implemented by being divided into an image processing device, such as a set-top box, for receiving broadcast signals or content according to various network services, and a content play-back device for playing content input from the image processing device.

In this case, an operating method of the wireless AV system 10 according to an embodiment of the present disclosure that will hereinafter be described may be performed not only by the main device 100 and the display device 200, as described above with reference to FIG. 1, but also by one of the divided image processing device, such as the set-top box, or content playback device, which includes an audio output unit 250.

In light of system input/output, the main device 100 may be referred to as a wireless source device that wirelessly provides a source, and the display device 200 may be referred to as a wireless sink device that wirelessly receives a source. The wireless source device and the wireless sink device may implement wireless display (WD) communication technologies that are compatible with standards such as wireless HD, wireless home digital interface (WHDI), WiGig, wireless USB, and Wi-Fi display (WFD, which also known as Miracast).

In light of the applications, the main device 100 may be integrated to a form that configures part of a wireless set-top box, a wireless gaming console, a wireless digital video disc (DVD) player, a wireless router, or the like. In this case, the main device 100 may be provided as a wireless communication module or a chip. The display device 200 may be integrated to a form that configures part of a user device or electronic device (e.g., a wireless TV, a wireless monitor, a wireless projector, a wireless printer, a wireless vehicle dashboard display, a wearable device, an augmented-reality (AR) headset, a virtual-reality (VR) headset, or the like) having a display panel so as to display an image and a video. In this case, the display device 200 may be provided in the form of a wireless communication module or chip.

The main device 100 and the display device 200 may be integrated to forms that configure parts of a mobile device. For example, the main device 100 and the display device 200 may be integrated into a mobile terminal including a smartphone, a smartpad, a tablet PC, or other types of wireless communication devices, a portable computer having a wireless communication card, a personal digital assistant (PDA), a portable media player, a digital image capturing device, such as a camera or camcorder, or other flash memory devices having wireless communication capabilities. In this case, the main device 100 and the display device 200 may be provided in the form of wireless communication modules or chips.

Smartphone users may perform streaming or mirroring of a video and an audio, which are outputted by the users' smartphones, tablet PCs, or other computing devices, to another device, such as a television or a projector, in order to provide a higher resolution display or other enhanced user experience.

As described above, the main device 100 may receive an external signal in a wired or wireless format that is related to a medium, such as audio, video, a picture, an image, multimedia, or at least one combination thereof, and the main device 100 may process the received external signal by using various methods, so as to generate a data stream or bitstream, and may transmit the data stream or bitstream to the display device 200 through a wireless interface.

Hereinafter, image (or picture)/video/audio data that are transmitted through a wireless interface will be collectively referred to as wireless data. That is, the main device 100 may wirelessly communicate with the display device 200 and may transmit wireless data. Therefore, in light of a wireless data transceiving system 1000, the main device 100 may be referred to as a wireless data transmission device 1100, and the display device 200 may be referred to as a wireless data reception device 1200. Hereinafter, the present disclosure will be described in more detail in light of the wireless data transceiving system 1000. Firstly, a detailed block diagram of the wireless data transceiving system 1000 will be illustrated.

Figure 2:
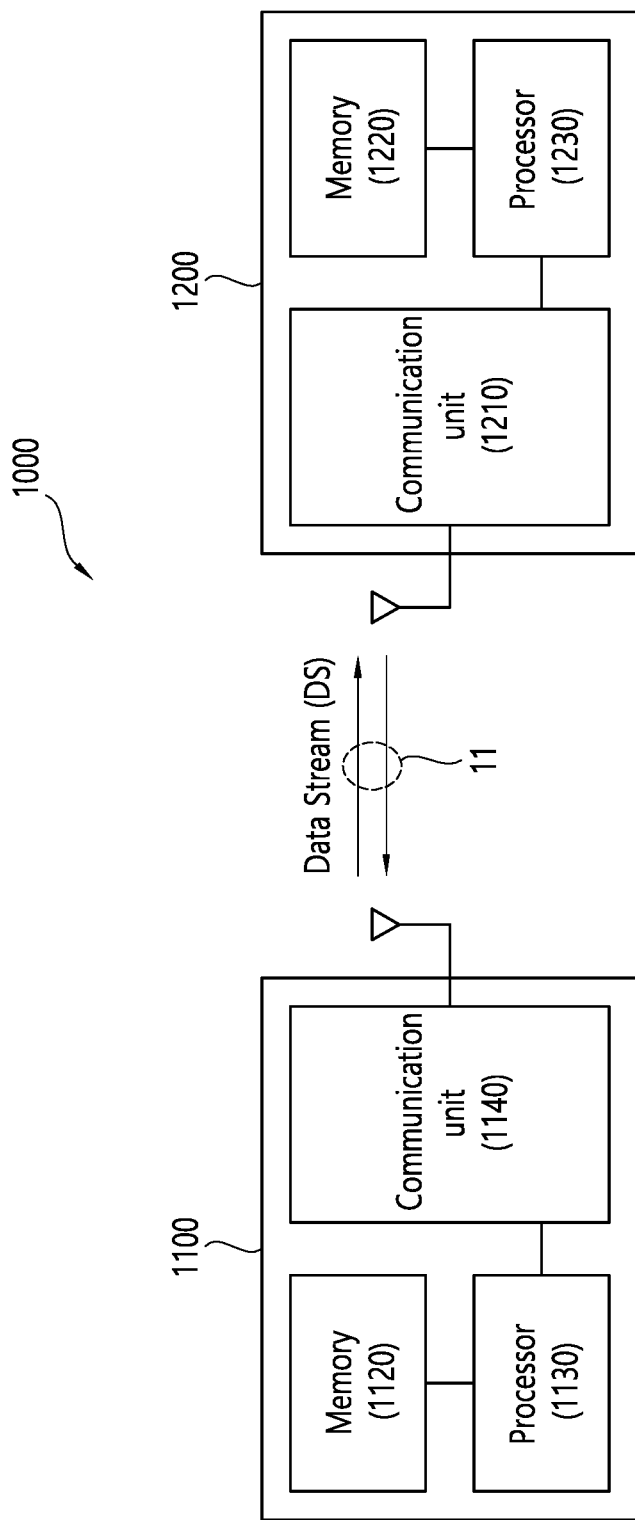
FIG. 2 is a block diagram showing a wireless data transceiving system according to an embodiment.

FIG. 2 is a block diagram showing a wireless data transceiving system according to an embodiment of the present disclosure.

Referring to FIG. 2, a wireless data transceiving system 1000 refers to a system that wirelessly transmits and receives a data stream. And, the wireless data transceiving system 1000 includes a wireless data transmission device 1100 and at least one wireless data reception device 1200.

The wireless data transmission device 1100 is communicatively coupled to the at least one wireless data reception device 1200.

According to an aspect, the data may be configured of an audio, a video, a picture, an image, multimedia, or at least one combination thereof.

According to another aspect, the data may include a bitstream in the form of a compressed audio, a bitstream in the form of a compressed video, a bitstream in the form of a compressed picture, a bitstream in the form of compressed multimedia, or at least one combination thereof. In this case, the wireless data transceiving system 1000 may also be referred to as a wireless compressed data stream transceiving system. Additionally, the wireless compressed data stream transceiving system 1000 may further include a functional or physical unit for compressing data.

Referring to the detailed configuration of each device, the wireless data transmission device 1100 includes a processor 1130, a memory 1120, and a communication unit 1140, and the wireless data reception device 1200 includes a communication unit 1210, a memory 1220, and a processor 1230.

The processor 1130 may be configured to implement the functions, procedures, and/or methods of the wireless data transmission device 1100 that are to be described with reference to each embodiment of the present specification. Also, the processor 1230 may also be configured to implement the functions, procedures, and/or methods of the wireless data reception device 1200 that are to be described with reference to each embodiment of the present specification. Layers of the wireless interface protocol may be implemented in the processors 1130 and 1230.

In light of the display system in FIG. 1, the processor 1130 may be configured to perform the function of the main controller 130. For example, the processor 1130 may decode a video, an image, a picture, a sound, or data related to a broadcast program that are inputted through the demodulator 112, the external device interface unit 115, or the storage unit 120, may process the decoded data by using various video/audio processing methods, such as compression and encoding, so as to transmit the data through a wireless channel, thereby generating a data stream or bitstream, and may transmit the generated data stream or bitstream to the display device 200 through the communication unit 1140.

The memories 1120 and 1220 are operatively coupled with the processors 1130 and 1230 and store various types of information for operating the processors 1130 and 1230.

The communication units 1140 and 1210 are operatively coupled with the processors 1130 and 1230 and wirelessly transmit and/or receive data. The communication units 1140 and 1210 establish a wireless link 11, and the wireless data transmission device 1100 and the wireless data reception device 1200 are inter-connected through the wireless link 11. The communication units 1140 and 1210 may be configured based on various wireless communication modes, such as short-range wireless communication including Wi-Fi, Bluetooth, NFC, and RFID, or a mobile communication network (e.g., 3G, 4G, and 5G cellular networks). For example, the wireless communication units 1140 and 1210 may perform communication by using a communication protocol, such as a standard of the IEEE 802.11 series.

FIG. 3 is a conceptual diagram of a case where the wireless data transceiving system according to an embodiment of the present disclosure is implemented according to an IEEE 802.11 series communication protocol.

Referring to FIG. 3, a wireless data transceiving system 20 in (A) of FIG. 3 may include at least one basic service set (hereinafter referred to as 'BSS') 21 and 25. A BSS is a set consisting of an access point (hereinafter referred to as 'AP') and a station (STA) that are successfully synchronized and, thus, capable of communicating with each other. Herein, the BSS does not refer to a specific region (or area).

For example, a first BSS 21 may include a first AP 22 and one first STA 21-1. A second BSS 25 may include a second AP 26 and one or more STAs 25-1 and 25-2. Herein, the first AP 22 may correspond to the communication unit 1140 of FIG. 2, and the one or more STAs 25-1 and 25-2 may correspond to the communication unit 1210 of FIG. 2.

An infrastructure BSS 21 and 25 may include at least one STA, APs 22 and 26 providing a distribution service, and a distribution system (DS) 27 connecting multiple APs.

The distribution system 27 may implement an extended service set (hereinafter referred to as 'ESS') 28, which is extended by being connected to multiple BSSs 21 and 25. The ESS 28 may be used as a term indicating one network that is configured by connecting one or more APs 22 and 26 through the distribution system 27. At least one AP being included in one ESS 28 may have a same service set identification (hereinafter referred to as 'SSID').

A portal 29 may perform the role of a bridge, which connects the wireless LAN network (IEEE 802.11) with another network (e.g., 802.X).

In a WLAN having the structure shown in (A) of FIG. 3, a network between the APs 22 and 26 and a network between the APs 22 and 26 and the STAs 21-1, 25-1, and 25-2 may be implemented.

Meanwhile, unlike the system shown in (A) of FIG. 3, the wireless data transceiving system 30 shown in (B) of FIG. 3 may be capable of performing communication by establishing a network between the STAs without any APs 22 and 26. A network that is capable of performing communication by establishing a network between the STAs without any APs 22 and 26 is defined as an Ad-Hoc network or an independent basic service set (hereinafter referred to as 'IBSS').

Referring to (B) of FIG. 3, the wireless data transceiving system 30 is a BSS that operates in the Ad-Hoc mode, i.e., an IBSS. Since the IBSS does not include any AP, a centralized management entity that performs a management function at the center does not exist. Therefore, in the wireless data transceiving system 30, STAs 31-1, 31-2, 31-3, 32-4, and 32-5 are managed in a distributed manner. Here, the STAs 31-1, 31-2, 31-3, 32-4, and 32-5 may correspond to the communication unit 1140 or the communication unit 1210 of FIG. 2.

All STAs 31-1, 31-2, 31-3, 32-4, and 32-5 included in the IBSS may be configured as mobile STAs and are not allowed to access a distributed system. All of the STAs included in the IBSS establish a self-contained network.

An STA that is mentioned in the present specification is a random functional medium including a medium access control (hereinafter referred to as 'MAC') and a physical layer interface for a wireless medium according to the regulations of the Institute of Electrical and Electronics Engineers (IEEE) 802.11 standard and may be used to broadly refer to both an AP and a non-AP STA.

An STA that is mentioned in the present specification may be referred to by using various terms, such a mobile terminal, a wireless device, a wireless transmit/receive unit (WTRU), a user equipment (UE), a mobile station (MS), a mobile subscriber unit, and, simply, a user.

Referring back to FIG. 2, a communication channel that is established by the communication units 1140 and 1210 may be a network communication channel. In this case, the communication units 1140 and 1210 may establish a tunneled direct link setup (TDLS) in order to avoid or reduce network congestion. Wi-Fi Direct and TDLS are used for setting up relatively short-range communication sessions. The communication channel that establishes a wireless link 11 may be a communication channel of a relatively short range or a communication channel that is implemented by using a physical channel structure, such as Wi-Fi using a variety of frequencies including 2.4 GHz, 3.6 GHz, 5 GHz, 60 GHz, or ultra-wideband (UWB), Bluetooth, and so on.

While techniques disclosed in the present specification may generally be described in relation with communication protocols, such as the IEEE 802.11 series standard, it will be apparent that aspects of such techniques may also be compatible with other communication protocols. Illustratively and non-restrictively, wireless communication between the communication units 1140 and 1210 may use orthogonal frequency-division multiplexing (OFDM) schemes. Other various wireless communication schemes including, but not limited to, time-division multiple access (TDMA), frequency-division multiple access (FDMA), code-division multiple access (CDMA), or any random combination of OFDM, FDMA, TDMA, and/or CDMA may also be used.

The processors 1130 and 1230 may include an application-specific integrated circuit (ASIC), a different chipset, a logic circuit, and/or a data processor. The memories 1120 and 1220 may include a read-only memory (ROM), a random access memory (RAM), a flash memory, a memory card, a storage medium, and/or another storage device. The communication units 1140 and 1210 may include a baseband circuit for processing radio frequency signals. When an embodiment is implemented as software, the techniques described herein may be implemented as a module (e.g., a procedure, function, and so on) that performs the functions described in the present specification. The module may be stored in the memories 1120 and 1220 and may be executed by the processors 1130 and 1230. The memories 1120 and 1220 may be implemented inside the processors 1130 and 1230. Alternatively, the memories 1120 and 1220 may be implemented outside of the processors 1130 and 1230, and the memories 1120 and 1220 may be communicatively connected to the processors 1130 and 1230 via various well-known means that are disclosed in this technical field.

In light of a wireless communication system (i.e., WLAN, Wi-Fi), the wireless data transmission device 1100 may be referred to as an AP or a personal basic service set control point (PCP) station, and the wireless data reception device 1200 may be referred to as an STA or a non-personal basic service set control point (non-PCP) station.

In light of the input/output of a data stream, the wireless data transmission device 1100 may be referred to as a wireless source device that wirelessly provides a source, and the wireless data reception device 1200 may be referred to as a wireless sink device that wirelessly receives a source. The wireless source device and the wireless sink device may implement wireless display (WD) communication technologies that are compatible with standards such as wireless HD, wireless home digital interface (WHDI), WiGig, wireless USB, and Wi-Fi display (WFD, which also known as Miracast).

In light of the applications, the wireless data transmission device 1100 may be integrated to a form that configures part of a wireless set-top box, a wireless gaming console, a wireless digital video disc (DVD) player, a wireless router, or the like. In this case, the wireless data transmission device 1100 may be provided as a wireless communication module or a chip. And, the wireless data reception device 1200 may be integrated to a form that configures part of a user device or electronic device (e.g., a wireless TV, a wireless monitor, a wireless projector, a wireless printer, a wireless vehicle dashboard display, a wearable device, an augmented-reality (AR) headset, a virtual-reality (VR) headset, or the like) having a display panel so as to display an image and a video. In this case, the wireless data reception device 1200 may be provided in the form of a wireless communication module or chip.

The wireless data transmission device 1100 and the wireless data reception device 1200 may be integrated to forms that configure parts of a mobile device. For example, the wireless data transmission device 1100 and the wireless data reception device 1200 may be integrated into a mobile terminal including a smartphone, a smartpad, a tablet PC, or other types of wireless communication devices, a portable computer having a wireless communication card, a personal digital assistant (PDA), a portable media player, a digital image capturing device, such as a camera or camcorder, or other flash memory devices having wireless communication capabilities. In this case, the wireless data transmission device 1100 and the wireless data reception device 1200 may be provided in the form of wireless communication modules or chips.

Smartphone users may perform streaming or mirroring of a video and an audio, which are outputted by the users' smartphones, tablet PCs, or other computing devices, to another device, such as a television or a projector, in order to provide a higher resolution display or other enhanced user experience.

Figure 4:
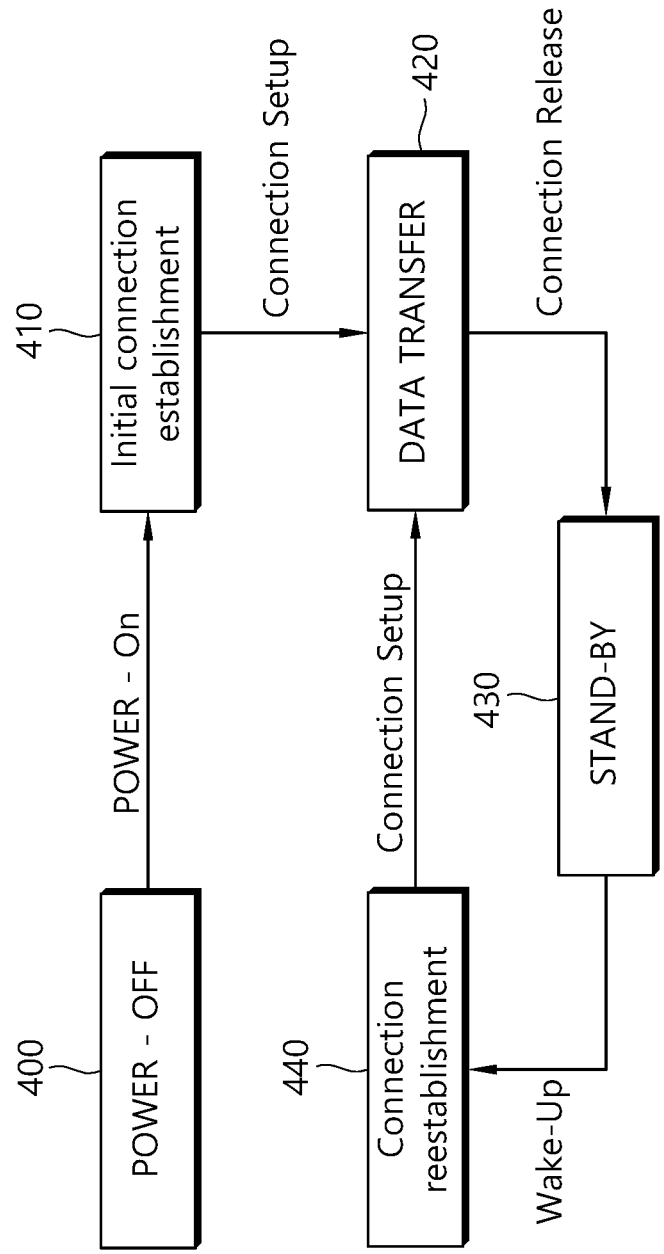
FIG. 4 illustrates a state machine of a wireless AV system according to an embodiment.

FIG. 4 illustrates a state machine of a wireless AV system according to an embodiment.

Referring to FIG. 4, the wireless AV system may enter or operate in a power-off mode 400, an initial connection establishment mode 410, a data transfer mode 420, a standby mode 430, and a connection reestablishment mode 440. The initial connection establishment mode may be referred to as an initial wakeup mode, and the connection reestablishment mode may be referred to simply as a connection establishment mode.

The wireless AV system may change or switch a mode thereof in an arrow direction. For example, when power is applied during an operation in the power-off mode 400, the wireless AV system may enter or switch to the initial connection establishment mode 410. When connection setup is completed during an operation in the initial connection establishment mode 410, the wireless AV system may enter or switch to the data transfer mode 420. When the wireless AV system is deactivated while operating in the data transfer mode 420, the wireless AV system may be disconnected and may enter or switch to the standby mode 430. When the wireless AV system is activated while operating in the standby mode 430, the wireless AV system may wake up and may enter or switch to the connection reestablishment mode 440. When connection setup is completed during an operation in the initial connection establishment mode 410, the wireless AV system may enter or switch to the data transfer mode 420 again.

Since the wireless AV system may include a wireless data transmission device and a wireless data reception device, the state machine according to FIG. 4 may be equally applied to each device. That is, each of the wireless data transmission device and the wireless data reception device may enter or operate in the power-off mode 400, the initial connection establishment mode 410, the data transfer mode 420, the standby mode 430, and the connection reestablishment mode 440. Further, the wireless data transmission device and the wireless data reception device may switch or enter a mode in the same manner as the wireless AV system switches or enter the mode.

An operation of the wireless data transmission device in each mode may be performed by the main controller 130 of FIG. 1 or the processor 1130 of FIG. 2 and the wireless communication unit 140 of FIG. 1 or the communication unit 1140 of FIG. 2.

An operation of the wireless data reception device in each mode may be performed by the panel controller 230 of FIG. 1 or the processor 1230 of FIG. 2 and the wireless communication unit 210 of FIG. 1 or the communication unit 1210 of FIG. 2.

In the present specification, activation of the wireless data transmission device may include an operation, a function, or a meaning according to various embodiments. For example, the activation of the wireless data transmission device may include an operation of turning on a function of transmitting data on an image. In another example, the activation of the wireless data transmission device may include an operation of powering on the wireless data transmission device by receiving a power-on signal from a remote control.

In the present specification, deactivation of the wireless data transmission device may include an operation, a function, or a meaning according to various embodiments. For example, the deactivation of the wireless data transmission device may include an operation of turning off a function of transmitting data on an image. In another example, the deactivation of the wireless data transmission device may include an operation of powering off the wireless data transmission device by receiving a power-off signal from a remote control. In any case, even if the wireless data transmission device is deactivated, the communication unit of the wireless data transmission device normally operates, and basic communication between the wireless data transmission device and the wireless data reception device may be continuously maintained.

The activation or deactivation of the wireless data transmission device may be detected and managed by the main controller 130 of FIG. 1 or the processor 1130 of FIG. 2.

In the present specification, activation of the wireless data reception device may include an operation, a function, or a meaning according to various embodiments. For example, the activation of the wireless data reception device may include an operation of turning on a function of receiving data on an image. In another example, the activation of the wireless data reception device may include an operation of powering on the wireless data reception device by receiving a power-on signal from a remote control. In still another example, the activation of the wireless data reception device may include an operation of powering on a display unit.

In the present specification, deactivation of the wireless data reception device may include an operation, a function, or a meaning according to various embodiments. For example, the deactivation of the wireless data reception device may include an operation of turning off a function of receiving data on an image. In another example, the deactivation of the wireless data reception device may include an operation of powering off the wireless data reception device by receiving a power-off signal from a remote control. In still another example, the deactivation of the wireless data reception device may include an operation of powering off the display unit. In any case, even if the wireless data reception device is deactivated, the communication unit of the wireless data reception device normally operates, and basic communication between the wireless data transmission device and the wireless data reception device may be continuously maintained.

The activation or deactivation of the wireless data reception device may be detected and managed by the panel controller 230 of FIG. 1 or the processor 1230 of FIG. 2.

Hereinafter, a wireless data transmission device and a wireless data transmission method for performing channel selection in a wireless AV system, and a wireless data reception device and a wireless data reception method for performing channel selection are disclosed. In the present specification, a device for performing channel selection may be variously described according to viewpoints. In one example, from the viewpoint of the wireless AV system, a device for performing channel selection may be a main device or a display device. In another example, from the viewpoint of a communication function, a device for performing channel selection may be a wireless communication unit or a communication unit. In still another example, from the viewpoint of a communication system, a device for performing channel selection may be referred to as a PCP or a non-PCP. Hereinafter, although embodiments of the present disclosure will be described using the term of a device for performing channel selection, the device for performing channel selection may be replaced with various other terms.

Channel selection according to the present specification may include not only initial channel selection in a state in which the wireless data transmission device and the wireless data reception device are not connected to each other but also an operation of changing a channel by selecting a new channel in a state in which the wireless data transmission device and the wireless data reception device are connected to each other.

In the present specification, it may be assumed that the wireless data transmission device and the wireless data reception device are connected one-to-one. Further, a high data rate is required in the wireless AV system. Accordingly, it may be assumed that the channel quality and occupancy ratio of a selected channel need to satisfy requirements according to the high data rate. In an embodiment of the present specification, a channel bandwidth is, for example, 4.32 GHz and may be contiguously configured. In addition, a 2×2 MIMO system may be used for data transmission between the wireless data transmission device and the wireless data reception device.

Figure 5:
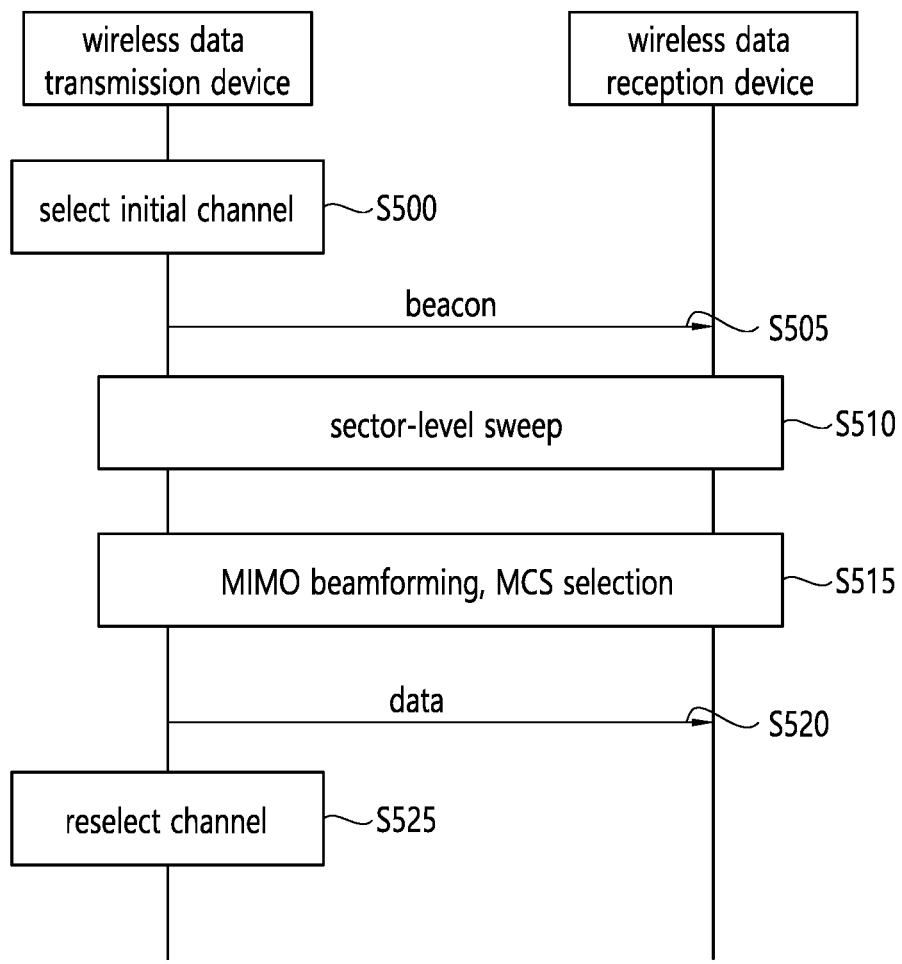
FIG. 5 is a flowchart illustrating a method for performing channel selection in a wireless AV system according to an embodiment.

FIG. 5 is a flowchart illustrating a method for performing channel selection in a wireless AV system according to an embodiment. This method relates to scenario 1 in which an initial channel is selected in a state in which the wireless data transmission device and the wireless data reception device are not connected to each other.

Referring to FIG. 5, the wireless data transmission device performs an operation of selecting an initial channel based on first channel monitoring in a state of being non-connected with the wireless data reception device (S500). S500 may be an operation entailed in BSS initialization as illustrated in FIG. 6.

Figure 6:
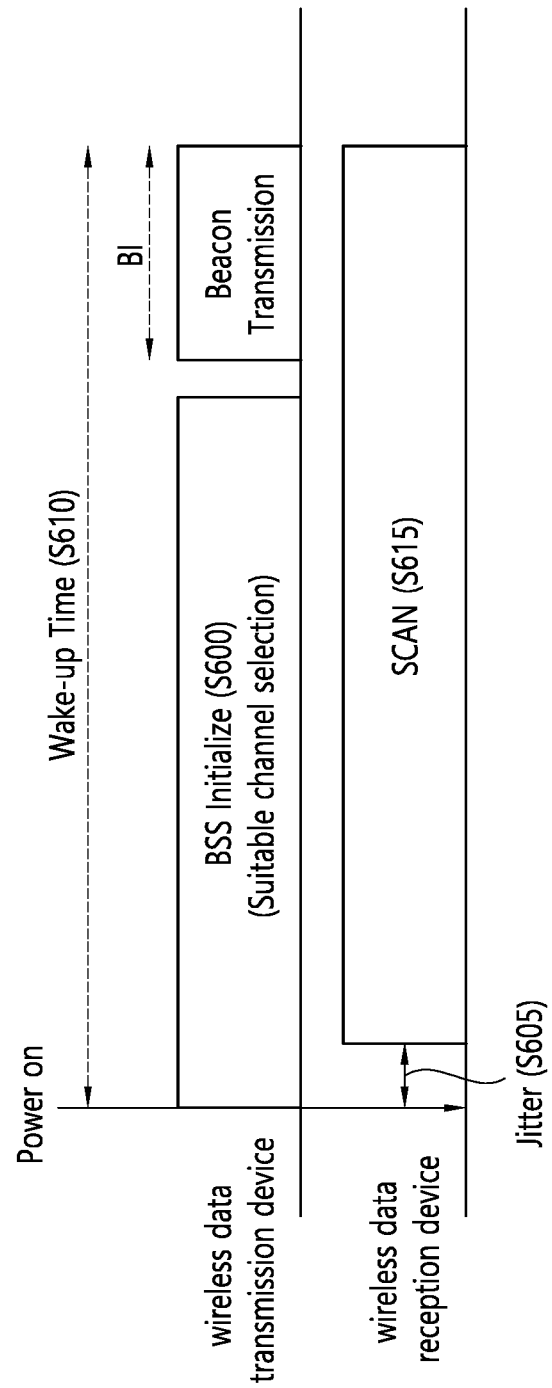
FIG. 6 illustrates an initial channel selection operation according to an example.

FIG. 6 illustrates an initial channel selection operation according to an example. Referring to FIG. 6, the wireless data transmission device and/or the wireless data reception device may be activated (i.e., powered on or enabled) to enter a BSS initialization phase (S600). Here, the wireless data transmission device and the wireless data reception device may be enabled substantially at the same time or with a certain jitter S605. The BSS initialization may be defined, for example, as a series of processes in which the wireless data transmission device selects a channel and transmits a beacon. After being activated, the wireless data transmission device may monitor a plurality of channels during a wake-up time S610, which may be referred to as first channel monitoring.

In this embodiment, the wake-up time may include a time required for the wireless data transmission device to select a channel for transmitting a beacon and a time required for the wireless data reception device to scan the channel. In one aspect, the wake-up time may be expressed as $T_m \times 5 + BI \times 5 + T_j$. Here, $T_m$ is defined as a time for which the wireless data transmission device performs channel monitoring, and as $T_m$ is longer, channel estimation performance may be further improved. Therefore, it is preferable that $T_m$ is set to be a time as long as possible by inverse calculation of a given wakeup time. BI×5 may be defined as a time required to scan all five channels (channels #9 to #13). Since the wireless data reception device cannot know which channel the wireless data transmission device selects, the wireless data reception device may scan all the channels until receiving a desired BSSID while changing a channel in beacon intervals (BIs) for a BI×5 time. $T_j$ may be defined as a jitter time.

The first channel monitoring according to the present embodiment may be performed based on a received signal strength or a received channel power indicator (RCPI). The RCPI and an NPI may be used as measurement metrics.

Referring back to FIG. 5, the wireless data transmission device may select, as an initial channel, a suitable channel from among the plurality of channels based on the first channel monitoring. Various specific embodiments are possible as initial channel selection methods based on the first channel monitoring.

In an example (channel ordering candidate 1), the wireless data transmission device may monitor all of the plurality of channels and may then select a best channel from among the plurality of channels as the initial channel.

In another example (channel ordering candidate 2), the wireless data transmission device may monitor the plurality of channels according to a predefined order and may select a suitable channel as the initial channel.

In one aspect, the suitable channel may be a channel satisfying a channel requirement among the plurality of channels.

In another aspect, monitoring according to the predefined order may include an operation in which the wireless data transmission device sequentially monitors non-overlapping channels among the plurality of channels first and then monitors channels that at least partially overlap the first monitored channels.

For example, it is assumed that the wireless data transmission device monitors a plurality of channels #9, #10, #11, #12, and #13. Contiguous channels may have at least partially overlapping bands. That is, channel #9 and channel #10 are contiguous and may thus at least partially overlapping bands.

When channel #9 does not meet the channel requirement, channel #10 contiguous to channel #9 is also highly likely to not meet the channel requirement. That is, channels having overlapping bands are highly likely to have similar channel qualities. In this case, rather than sequentially monitoring similar channels, non-overlapping channels are monitored first. When channel #9 is selected as a channel to be monitored first, the wireless data transmission device may monitor channel #9 and may then monitor channel #11 instead of contiguous channel #10. That is, the wireless data transmission device may monitor the channels in an order of #9, #11, #13, #10, and #12.

Accordingly, the wireless data transmission device may first monitor channels #9, #11, and #13 that do not overlap each other among the plurality of channels and may then monitor channels #10 and #12 that at least partially overlap channels #9, #11, and #13. That is, the channels overlapping the first monitored channels are low monitoring priorities, and the channels not overlapping the first monitored channels are high monitoring priorities. According to this channel ordering, a channel monitoring time may be reduced.

When initial channel selection is completed, the wireless data transmission device transmits a beacon on the selected initial channel (S505). Here, the wireless data reception device scans (S615) a beacon on each channel during a beacon interval (BI) as illustrated in FIG. 6. Since the wireless data reception device cannot know which channel is selected by the wireless data transmission device, the wireless data reception device may scan all channels until receiving a desired BSSID while changing a channel in BIs. That is, when the wireless data reception device fails to obtain the desired BSSID on a channel, the wireless data reception device scans the next channel. After the BSS initialization, when there is no response from the wireless data reception device for a certain time (e.g., two BIs), the wireless data transmission device may reselect a channel other than a currently used channel.

The wireless data transmission device and the wireless data reception device perform a sector-level sweep (SLS) process (S510) and perform MIMO beamforming for channel quality measurement and an MCS selection process (S515).

The SLS process is intended to enable communication between two STAs at a control PHY rate or in a high MCS. In particular, the SLS process provides only transmission of BF training. SLS is a protocol for performing link detection in the wireless AV system to which the present disclosure is applicable, and may be a beam training method in which network nodes continuously transmit and receive frames including performance information on a reception channel link while changing only a beam direction and select a beam direction enabling the best index (e.g., a signal-to-noise ratio (SNR) or a received signal strength indicator (RSSI)) indicating an optimal frame among successfully received frames.

A MIMO beamforming process may be divided into four subphases. This MIMO process may be an operation performed in physical layers of an initiator and a responder. Specifically, the MIMO beamforming process may include a BF setup phase, a BF training phase by the initiator, a BF phase by the responder, and a BF feedback phase. In the wireless AV system, the initiator may be an AV data transmission device, and the responder may be an AV data reception device. In the wireless AV system, there may be control or management data transmitted by the AV data reception device in addition to AV data. In this case, the AV data reception device may be the initiator, and the AV data transmission device may be the responder. Hereinafter, a device to transmit data or a peer device is referred to as an initiator, and a device to receive data or a peer device is referred to as a responder.

When a MCS selected according to S515 satisfies a required data rate, the wireless data transmission device may start data transmission (S520). When the MCS selected according to S515 does not satisfy the required data rate, the wireless data transmission device may perform a channel reselection process (S525).

In the embodiment with reference to FIG. 5 and FIG. 6, the operation of the wireless data transmission device may be performed by the communication unit 1140, and the operation of the wireless data reception device may be performed by the communication unit 1210.

Figure 7:
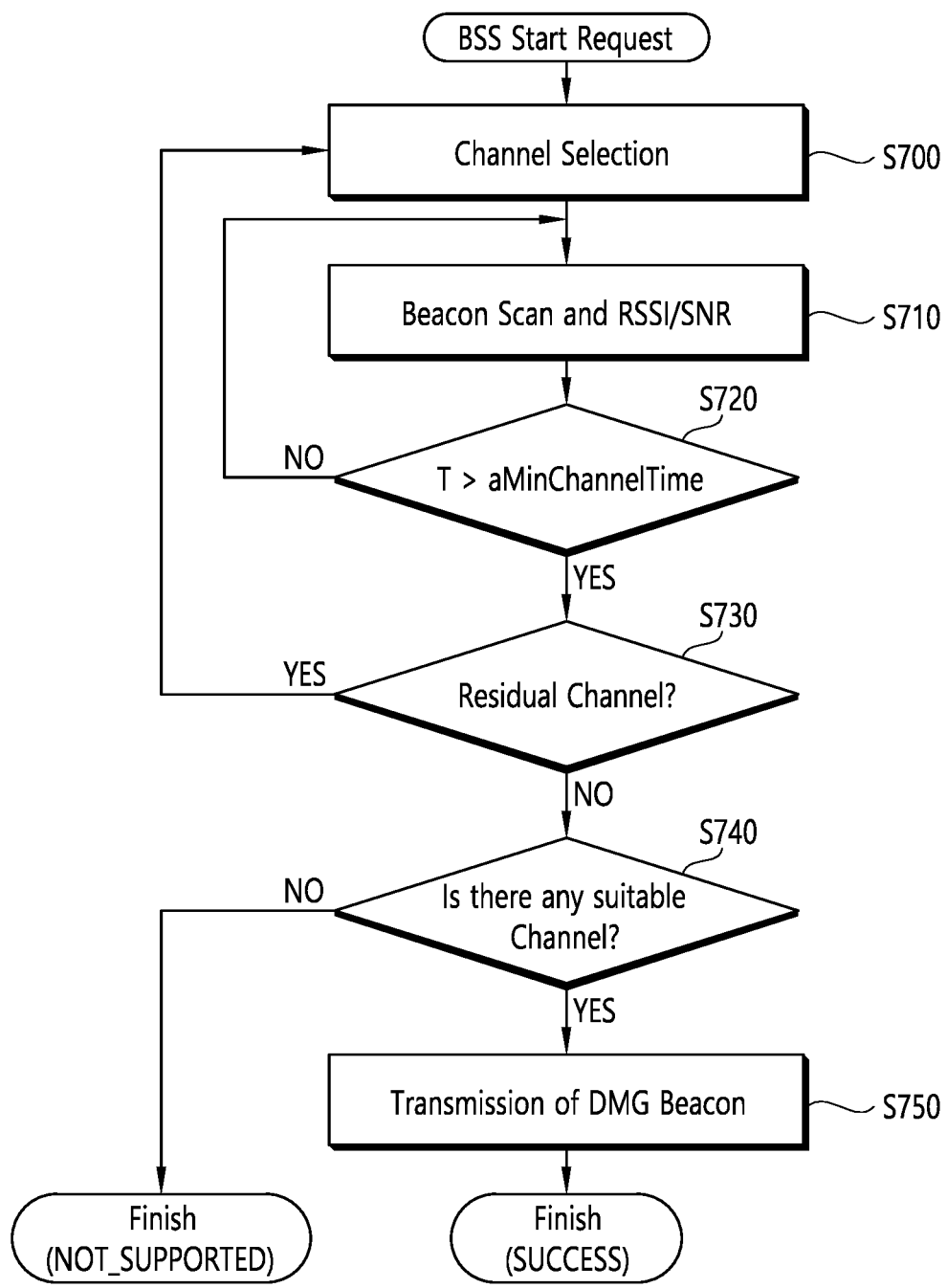
FIG. 7 illustrates a specific method in which a wireless data transmission device performs initial channel selection according to an embodiment.

FIG. 7 illustrates a specific method in which the wireless data transmission device performs initial channel selection according to an embodiment. This method relates to a channel selection method according to channel ordering candidate 1 in scenario 1.

The wireless data transmission device performs channel selection (S700), and the wireless data reception device scans a beacon (S710). The wireless data transmission device determines whether a time T is greater than a minimum channel time (aMinChannelTime) (S720). When the time T is greater than the minimum channel time (aMinChannelTime), the wireless data transmission device determines whether there is a residual channel to be monitored (S730). When there is no residual channel, the wireless data transmission device determines whether there is a suitable channel (S740). When there is a suitable channel, the wireless data transmission device transmits a DMG beacon (S750).

When the time T is not greater than the minimum channel time (aMinChannelTime) in S720, the wireless data transmission device performs S710 again.

When there is no residual channel in S730, the wireless data transmission device performs SS700 again.

When there is no suitable channel in S740, the wireless data transmission device terminates a channel selection process.

Figure 8:
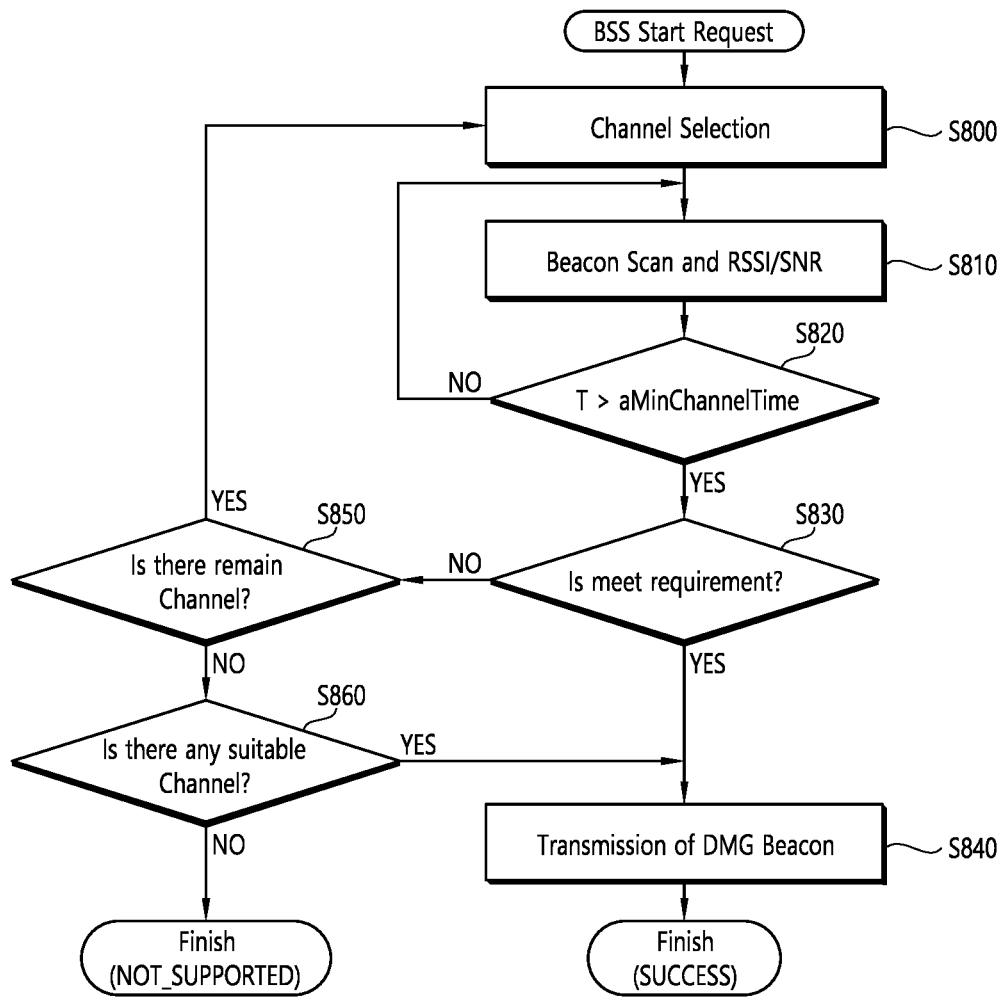
FIG. 8 illustrates a specific method in which a wireless data transmission device performs initial channel selection according to another embodiment.

FIG. 8 illustrates a specific method in which the wireless data transmission device performs initial channel selection according to another embodiment. This method relates to a channel selection method according to channel ordering candidate 2 in scenario 1.

Referring to FIG. 8, the wireless data transmission device performs channel selection (S800), and the wireless data reception device scans a beacon (S810). The wireless data transmission device determines whether a time T is greater than a minimum channel time (aMinChannelTime) (S820). When the time T is greater than the minimum channel time (aMinChannelTime), the wireless data transmission device determines whether a currently monitored channel satisfies a channel requirement (S830). When the currently monitored channel satisfies the channel requirement, the wireless data transmission device transmits a DMG beacon (S840).

When the time T is not greater than the minimum channel time (aMinChannelTime) in S820, the wireless data transmission device performs S810 again.

When the currently monitored channel does not satisfy the channel requirement in S830, the wireless data transmission device determines whether there is a residual channel (S850), and when there is a residual channel, the wireless data transmission device performs S800 again. When there is no residual channel, the wireless data transmission device determines whether there is a suitable channel (S860). When there is a suitable channel, the wireless data transmission device transmits the DMG beacon on the suitable channel (S840). However, when there is no suitable channel, the wireless data transmission device terminates a channel selection process.

In the embodiments with reference to FIG. 7 and FIG. 8, the operation of the wireless data transmission device may be performed by the communication unit 1140, and the operation of the wireless data reception device may be performed by the communication unit 1210.

Figure 9:
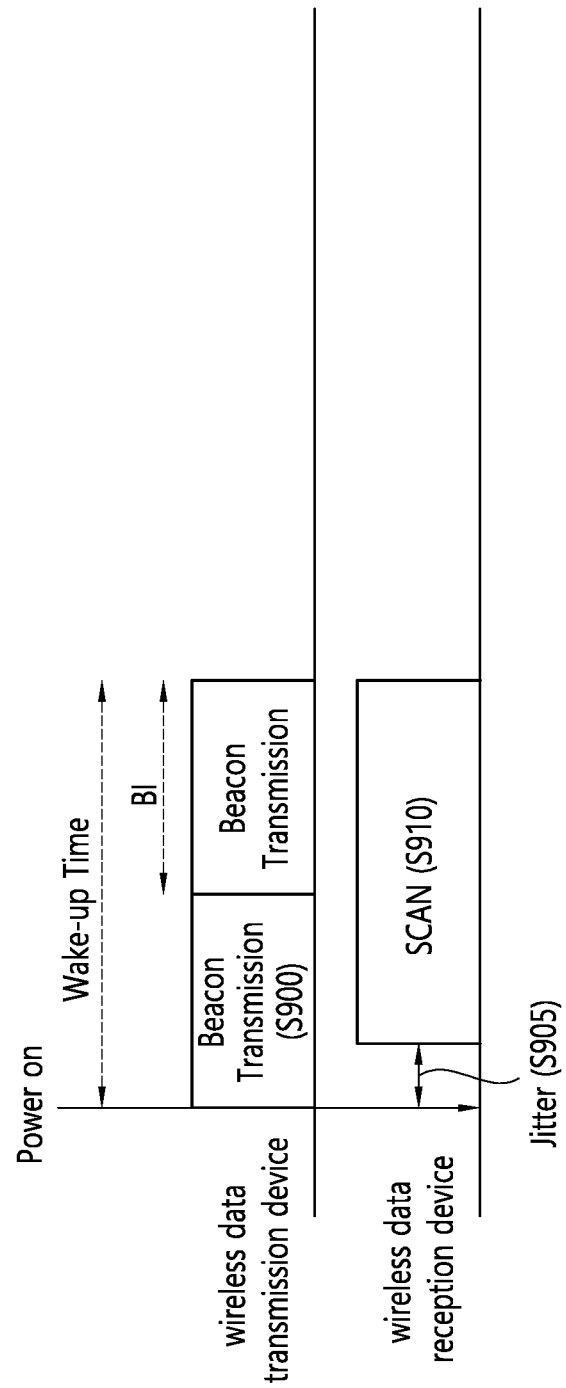
FIG. 9 illustrates an initial channel selection operation according to another example.

FIG. 9 illustrates an initial channel selection operation according to another example.

Referring to FIG. 9, unlike the initial channel selection operation according to FIG. 6, a BSS initialization phase is excluded. That is, after the wireless data transmission device and/or the wireless data reception device is activated (i.e., powered on or enabled), the wireless data transmission device directly transmits a beacon without entering a BSS initialization phase (S900). Here, a channel through which the beacon is transmitted may be an existing preferred channel.

The preferred channel may be at least one of a previously agreed channel for use in a state in which the wireless data transmission device and the wireless data reception device are connected, or a previously selected channel, or previously monitored channels.

Assuming that the wireless data transmission device and the wireless data reception device mutually know that the beacon is transmitted through the preferred channel, the wireless data reception device may scan the beacon in the preferred channel (S910).

Here, the wireless data transmission device and the wireless data reception device may be enabled substantially at the same time or with a certain jitter S905. The wireless data transmission device may transmit the beacon on the preferred channel during a wake-up time after being activated, and the wireless data reception device may scan the beacon on the preferred channel during the wake-up time after being activated.

Accordingly, in this embodiment, the wake-up time may include a time required for the wireless data transmission device to transmit the beacon or for the wireless data reception device to receive the beacon. In one aspect, the wake-up time may be expressed as $BI+T_j$. Here, BI may be defined as a time required for the wireless data reception device to receive the beacon. $T_j$ may be defined as a jitter time.

When there is no response from the wireless data reception device for a predetermined time (e.g., two BIs), the wireless data transmission device may perform an initial channel selection operation through BSS initialization according to the method shown in FIG. 6. Here, previously used channels (i.e. the preferred channel) may be excluded from monitoring. When the wireless data reception device does not receive the beacon from the wireless data transmission device for a predetermined time (e.g., two BIs), the wireless data reception device may perform a channel scan in the operation shown in FIG. 6, that is, in the BSS initialization phase.

When transmission and reception of the beacon according to the preferred channel are normally completed, the wireless data transmission device and the wireless data reception device perform an SLS process, a MIMO beamforming process for channel quality measurement, and an MCS selection process. When the quality of a MIMO channel satisfies a required data rate, the wireless data transmission device may start data transmission. However, when the quality of the MIMO channel does not satisfy the required data rate, the wireless data transmission device may perform a channel reselection procedure.

In the embodiment with reference to FIG. 9, the operation of the wireless data transmission device may be performed by the communication unit 1140, and the operation of the wireless data reception device may be performed by the communication unit 1210.

Figure 10:
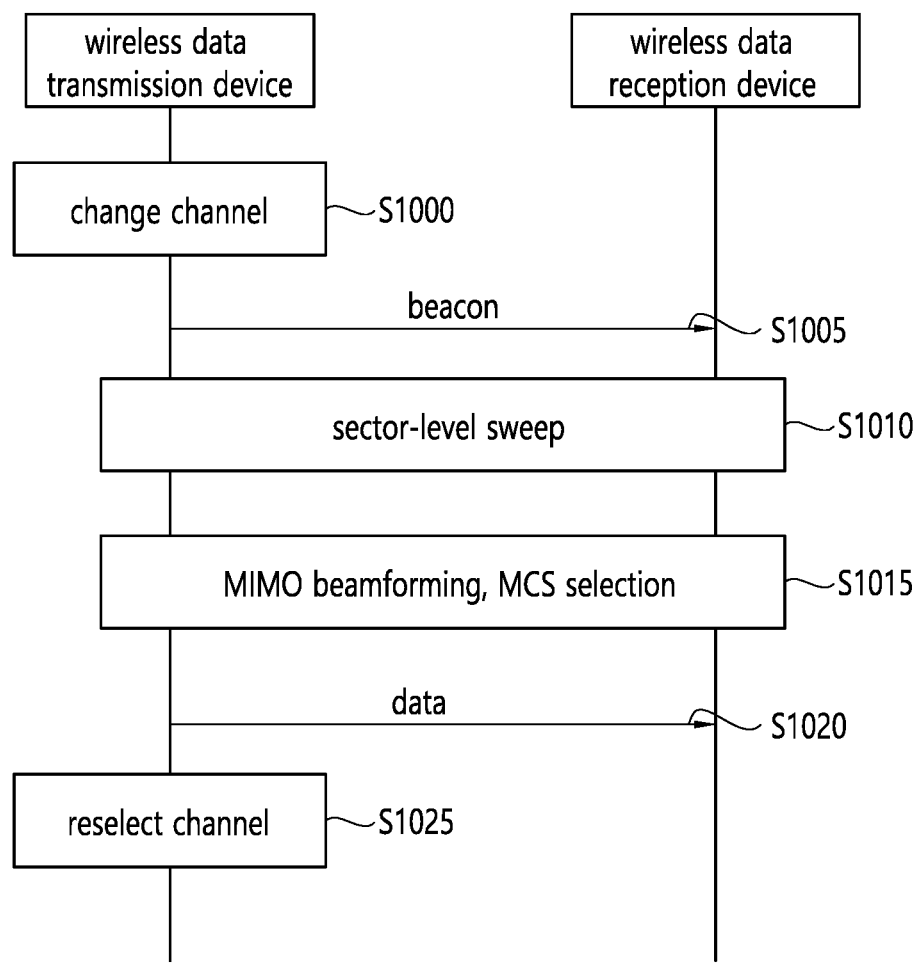
FIG. 10 is a flowchart illustrating a method for performing channel selection in a wireless AV system according to another embodiment.

FIG. 10 is a flowchart illustrating a method for performing channel selection in a wireless AV system according to another embodiment. This method relates to scenario 2 in which a channel is changed in a state in which the wireless data transmission device and the wireless data reception device are connected to each other Referring to FIG. 10, the wireless data transmission device enters a standby mode in a state of being connected with the wireless data reception device and then performs an operation of changing a channel based on second channel monitoring (S1000). Changing a channel is equivalent to selecting a new channel. The standby mode may be referred to as a sleep mode.

In the standby mode, data transmission by the wireless data transmission device does not occur. In the standby mode, the wireless data transmission device periodically transmits a beacon. The beacon may be transmitted on a channel selected according to initial channel selection as in scenario 1 according to FIG. 5 to FIG. 9. In the standby mode, the wireless data reception device receives the periodically transmitted beacon. Here, beam maintenance may not be performed. In the standby mode, when data transmission is requested, the wireless data transmission device may use a beacon including a non-enhanced directional multi-gigabit (EDMG) physical layer protocol data unit (PPDU) to wake up the wireless data reception device. Here, before data transmission, the wireless data transmission device and the wireless data reception device may perform an SLS process, an association process, and a MIMO beamforming process. A beacon interval (BI) used for wakeup may be, for example, 70 ms.

In S1000, the second channel monitoring includes channel monitoring in a period in which the beacon is not transmitted. Alternatively, the second channel monitoring includes channel monitoring of all channels when there is no data transmission in the period in which the beacon is not transmitted. Alternatively, the second channel monitoring includes periodic channel monitoring of all channels when there is no data transmission in the period in which the beacon is not transmitted.

Figure 11:
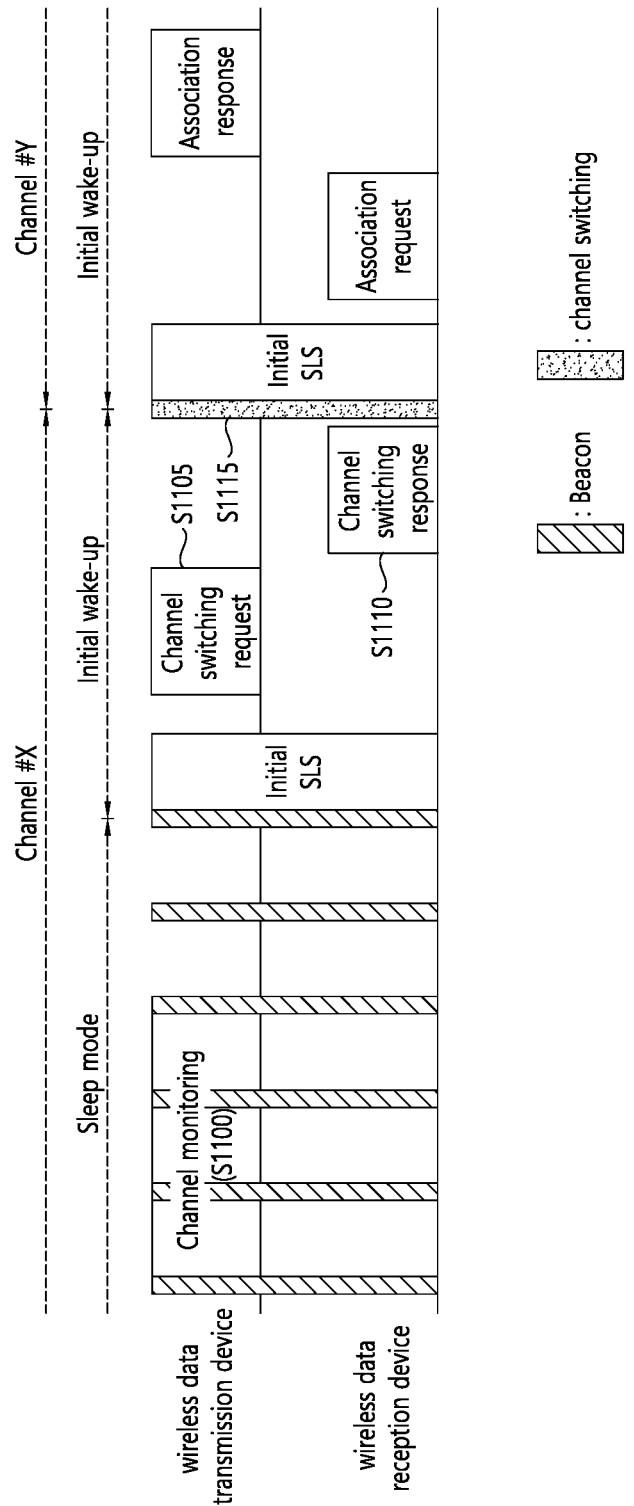
FIG. 11 illustrates a process of changing a channel according to second channel monitoring according to an example.

FIG. 11 illustrates a process of changing a channel according to second channel monitoring according to an example. This process corresponds to candidate 1 in scenario 2.

Referring to FIG. 11, the wireless data transmission device and the wireless data reception device are currently connected through channel #X. In the sleep mode, the wireless data transmission device performs channel monitoring (S1100). The channel monitoring according to S1100 may correspond to the second channel monitoring according to S1000. Here, the wireless data transmission device may perform channel monitoring on all channels in periods in which a beacon is not transmitted.

The wireless data transmission device may select a new channel based on the result of performing the channel monitoring and may switch to the newly selected channel after waking up. Switching to the newly selected channel may include an operation in which the wireless data transmission device transmits channel switching request information to the wireless data reception device (S1105), an operation in which the wireless data reception device transmits channel switching response information to the wireless data transmission device (S1110), and an operation in which the wireless data transmission device and the wireless data reception device change to the new channel (S1115). Here, the channel switching request information may include information on the channel newly selected by the wireless data transmission device.

When switching to the new channel is completed, the wireless data transmission device and the wireless data reception device may use the switched channel as a future preferred channel (refer to candidate 2 in scenario 1).

Figure 12:
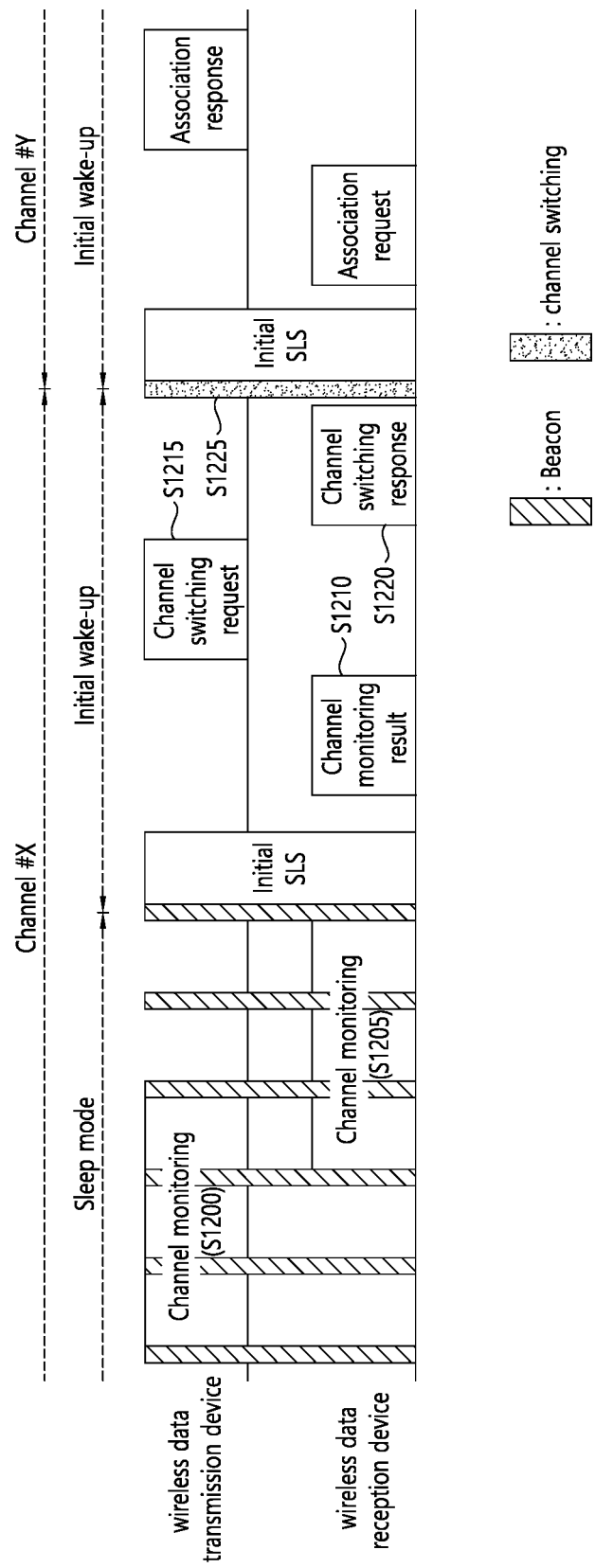
FIG. 12 illustrates a process of changing a channel according to the result of monitoring a plurality of channels according to another example.

FIG. 12 illustrates a process of changing a channel according to the result of monitoring a plurality of channels according to another example. This process corresponds to candidate 2 in scenario 2.

Referring to FIG. 12, the wireless data transmission device and the wireless data reception device are currently connected through channel #X. In the sleep mode, the wireless data transmission device performs channel monitoring (S1200). The channel monitoring according to S1200 may correspond to the second channel monitoring according to S1000. Here, the wireless data transmission device may perform channel monitoring on all channels in periods in which a beacon is not transmitted.

In the sleep mode, the wireless data reception device performs channel monitoring (S1205). Channel monitoring by the wireless data reception device may be referred to as third channel monitoring to be distinguished from channel monitoring by the wireless data transmission device. Like the second channel monitoring, the third channel monitoring includes channel monitoring in a period in which no beacon is transmitted. Alternatively, the third channel monitoring includes channel monitoring of all channels in the period in which no beacon is transmitted. Alternatively, the third channel monitoring includes periodic channel monitoring of all channels in the period in which no beacon is transmitted.

After initial SLS, the wireless data reception device transmits information on the result of the third channel monitoring thereof to the wireless data transmission device (S1210).

The wireless data transmission device may select an optimal new channel based on the result of second channel monitoring and the information on the third channel monitoring and may switch to the newly selected channel after waking up. Switching to the newly selected channel may include an operation in which the wireless data transmission device transmits channel switching request information to the wireless data reception device (S1215), an operation in which the wireless data reception device transmits channel switching response information to the wireless data transmission device (S1220), and an operation in which the wireless data transmission device and the wireless data reception device change to the new channel (S1225).

When switching to the new channel is completed, the wireless data transmission device and the wireless data reception device may use the switched channel as a future preferred channel (refer to candidate 2 in scenario 1).

In the embodiments with reference to FIG. 11 and FIG. 12, the operation of the wireless data transmission device may be performed by the communication unit 1140, and the operation of the wireless data reception device may be performed by the communication unit 1210.

Figure 13:
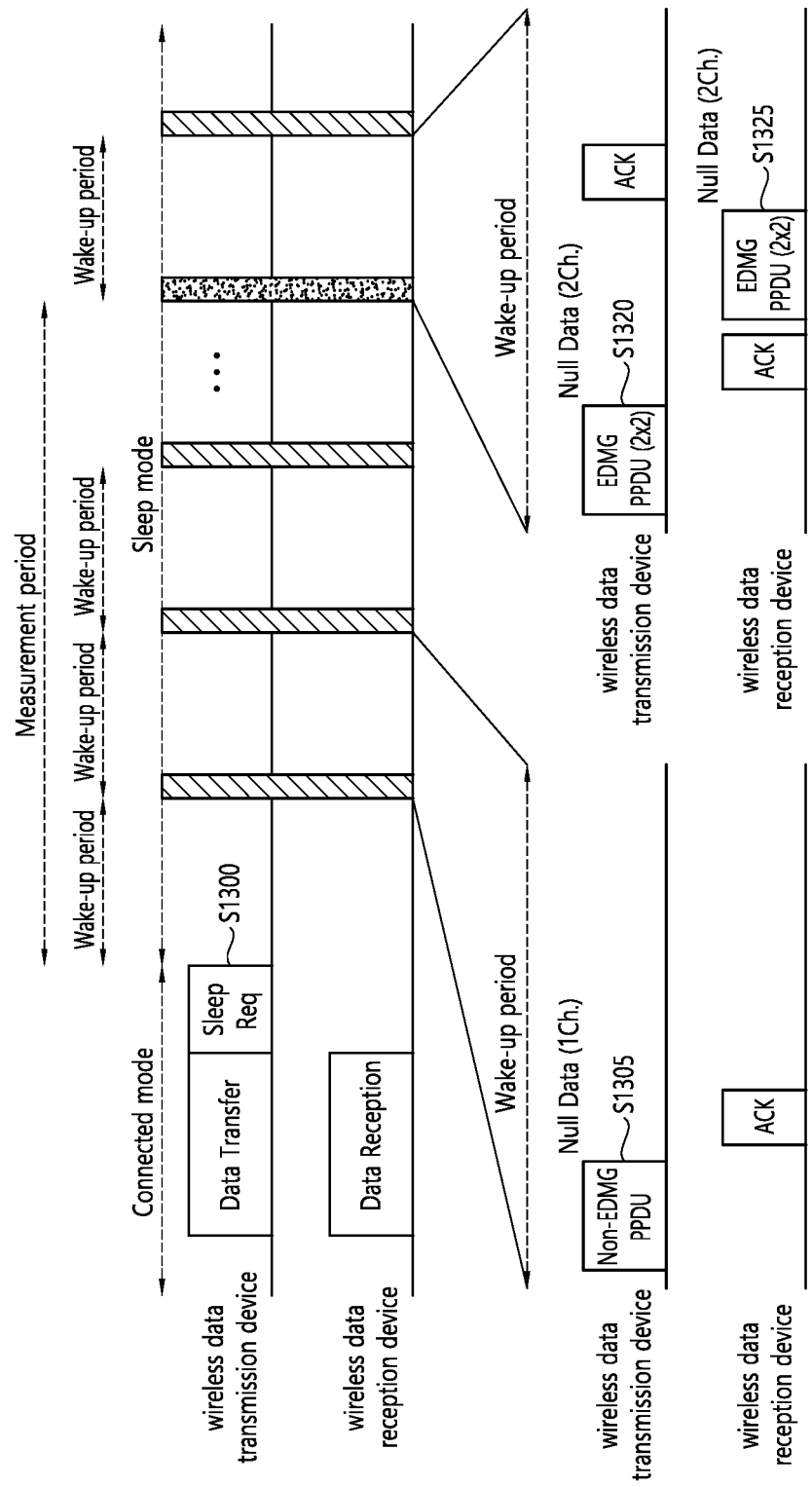
FIG. 13 illustrates a process of changing a channel according to the result of measuring a channel quality according to still another example.

FIG. 13 illustrates a process of determining whether a channel switch is needed or whether monitoring a different channel is needed according to still another example. This process corresponds to scenario 3.

A switch to a new channel according to this embodiment may be triggered based on a channel monitoring result or may be triggered when a previously selected MCS or MIMO beamforming no longer satisfies a channel requirement.

Referring to FIG. 13, in a connected state, the wireless data transmission device and the wireless data reception device operate in the standby mode or the sleep mode in which data transmission and data reception are not performed (S1300).

In the standby mode, when data transmission is requested, the wireless data transmission device may transmit a beacon including a non-EDMG PPDU to wake up the wireless data reception device (S1305). Data transmission may be triggered by the non-EDMG PPDU. The non-EDMG PPDU is null data and may include a training (TRN) field at an end thereof.

In the standby mode, the wireless data transmission device monitors a connected channel in a period excluding a period in which first null data is transmitted or received (S1310). In the standby mode, the wireless data reception device monitors the connected channel in a period excluding a period in which second null data is transmitted or received (S1315). The first null data may include a first EDMG PPDU for selecting a modulation and coding scheme (MCS) in a first direction on the currently connected channel. The second null data may include a second EDMG PPDU for selecting a MCS in a second direction on the currently connected channel. The first direction may be a forward link, and the second direction may be a reverse link. Alternatively, the first direction may be the reverse direction, and the second direction may be the forward direction. The forward direction refers to a data transmission path or direction from the wireless data transmission device to the wireless data reception device, and the reverse direction refers to a data transmission path or direction from the wireless data reception device to the wireless data transmitter. The first null data and the second null data may be transmitted or received, for example, according to a wake-up period. Each of the first null data and the second null data may include a training (TRN) field at an end thereof, and the wireless data transmission device and the wireless data reception device may each perform beam maintenance based on the training field.

The wireless data transmission device transmits the first null data to the wireless data reception device (S1320). The wireless data reception device receives the first null data and selects a first MCS based on the result of receiving the first null data. The wireless data reception device reports or transmits information on the selected first MCS and/or the result of monitoring the channel according to S1315 to the wireless data transmission device.

The wireless data reception device transmits the second null data to the wireless data transmission device (S1325). The wireless data transmission device determines whether to change the channel based on at least one of the result of receiving the second null data, the result of monitoring the channel according to S1310, the result of monitoring the channel according to S1315, and the information on the first MCS. Before a channel change is triggered based on the MCS, beam maintenance may be performed first.

The channel change in this embodiment may be triggered i) when the previously selected MCS does not satisfy a channel requirement or ii) when the occupancy ratio of the channel does not satisfy a requirement.

Determining whether the channel change is necessary may be performed according to the following process. This process corresponds to scenario 4. In scenario 4, when monitoring of a channel is necessary, the wireless data transmission device indicates the channel to the wireless data reception device, the wireless data transmission device and the wireless data reception device each monitor the channel, and then the wireless data transmission device determines suitability of the monitored channel. A specific process is as follows.

First, the wireless data transmission device selects a channel to be monitored and indicates the channel to the wireless data reception device. Here, whether monitoring of the channel is necessary may be determined by the method according to scenario 3 illustrated above. Next, the wireless data transmission device and the wireless data reception device monitor the selected channel for a predetermined time. The wireless data reception device reports the result of monitoring the channel to the wireless data transmission device using the previously connected channel. The wireless data transmission device determines suitability of the channel based on the result of monitoring the channel thereby and the result of monitoring the channel by the wireless data reception device.

When it is determined that a channel change is necessary, the channel change may be performed by the method according to scenario 2. For example, performing the channel change by the method according to scenario 2 includes performing the channel change through transmission of the channel switching request information (S1105) and reception of the channel switching response information (S1110) according to FIG. 11.

In the embodiment with reference to FIG. 13, the operation of the wireless data transmission device may be performed by the communication unit 1140, and the operation of the wireless data reception device may be performed by the communication unit 1210.

Since the device and method for receiving wireless data or the device and method for transmitting wireless data according to the above-described embodiments of the present disclosure do not mandatorily require all of the components or operations that are described above, the device and method for receiving wireless data or the device and method for transmitting wireless data may be performed by including all or part of the above-described components or operations. Additionally, the above-described embodiments of the device and method for receiving wireless data or the device and method for transmitting wireless data may be performed in combination with each other. Furthermore, the above-described components or operations are not mandatorily required to be performed in the order that is described above, and, therefore, it is also possible for components or operations (or process steps) that are described in a later order to be performed before the components or operations (or process steps) that are described in an earlier order.

The foregoing description has been presented merely to provide an exemplary description of the technical idea of the present disclosure, and it will be apparent to those skilled in the art to which the present disclosure pertains, that various changes and modifications in the embodiments described herein can be made without departing from the scope and spirit of the present disclosure. Therefore, the embodiments of the present disclosure described above can be implemented separately or in combination with each other.

The embodiments disclosed herein are provided not to limit the technical idea of the present disclosure but to describe the present disclosure, and the scope of the technical idea of the present disclosure should not be limited to these embodiments. The scope of the present disclosure should be interpreted by the following claims, and all technical ideas within the scope of equivalents thereto should be construed as being included in the scope of the present disclosure.

What is claimed is:

1. A wireless data transmission device for performing channel selection in a wireless audio-video (AV) system, the device comprising:
a communication unit configured to perform a process of selecting an initial channel based on first channel monitoring in a non-connected state, a process of transmitting a periodic beacon on the initial channel in a standby mode after switching to a connected state, and a process of selecting a new channel based on second channel monitoring in a period in which no beacon is transmitted in the standby mode; and
a processor connected to the communication unit to control an operation of the communication.

2. The device of claim 1, wherein the first channel monitoring and the second channel monitoring are performed based on a received signal strength or a received channel power indicator (RCPI), and
the first channel monitoring comprises a process of the communication unit monitoring a plurality of channels according to a predefined order based on basic service set (BSS) initialization and selecting a suitable channel as the initial channel.

3. The device of claim 2, wherein the suitable channel is a best channel among the plurality of channels.

4. The device of claim 2, wherein the process of monitoring according to the predefined order comprises a process of sequentially monitoring non-overlapping channels among the plurality of channels first and then monitoring channels that at least partially overlap the first monitored channels, and
the suitable channel is a channel satisfying a channel requirement among the plurality of channels.

5. The device of claim 2, wherein, when the communication unit switches from the connected state to the non-connected state, the communication unit transmits the periodic beacon on a preferred channel according to the second channel monitoring, and
the communication unit performs the first channel monitoring when failing to receive a response to at least n beacons from a wireless data reception device.

6. The device of claim 1, wherein the process of selecting the new channel comprises a process of the communication unit transmitting channel switching request information to a wireless data reception device based on the second channel monitoring, a process of receiving channel switching response information from the wireless data reception device, and a process of switching to the new channel.

7. The device of claim 1, wherein the process of selecting the new channel comprises a process of the communication unit receiving information on third channel monitoring by a wireless data reception device from the wireless data reception device, a process of the communication unit transmitting channel switching request information to the wireless data reception device based on the second channel monitoring and the information on the third channel monitoring, a process of receiving channel switching response information from the wireless data reception device, and a process of switching to the new channel.

8. The device of claim 1, wherein the process of selecting the new channel comprises a process of transmitting a first enhanced directional multi-gigabit (EDMG) physical layer protocol data unit (PPDU) for selecting a modulation and coding scheme (MCS) in a first direction to a wireless data reception device on a currently connected channel, a process of receiving a second EDMG PPDU for selecting a MCS in a second direction from the wireless data reception device on the currently connected channel, a process of receiving MCS information selected based on the first EDMG PPDU and information on third channel monitoring by the wireless data reception device from the wireless data reception device, and a process of switching to the new channel based on a result of the second channel monitoring and the information on the third channel monitoring.

9. The device of claim 8, wherein the first EDMG PPDU and the second EDMG PPDU are null data and each comprise a training (TRN) field at an end thereof, and the communication unit performs beam maintenance based on the training field.

10. The device of claim 8, wherein the first EDMG PPDU and the second EDMG PPDU are transmitted according to a wake-up period.

11. A wireless data reception device for performing a channel scan in a wireless audio-video (AV) system, the device comprising:
- a communication unit configured to perform a process of scanning a plurality of channels in a state of being non-connected with a wireless data transmission device, a process of receiving a beacon on an initial channel selected by the wireless data transmission device, a process of performing channel monitoring in a period in which the beacon is not transmitted in a standby mode after switching to a connected state, a process of transmitting a result of the channel monitoring to the wireless data transmission device, and a process of switching to a new channel; and
- a processor connected to the communication unit to control an operation of the communication.

12. The device of claim 11, wherein the channel monitoring is performed based on a received signal strength or a received channel power indicator (RCPI).

13. The device of claim 11, wherein the initial channel is a best channel among the plurality of channels.

14. The device of claim 11, wherein the initial channel is a channel satisfying a channel requirement among the plurality of channels.

15. The device of claim 11, wherein, when the communication unit switches from the connected state to the non-connected state, if failing to receive a response to at least n beacons from the wireless data transmission device, the communication unit performs the channel monitoring again.

16. The device of claim 11, wherein the process of switching to the new channel comprises a process of the communication unit receiving channel switching request information from the wireless data transmission device and a process of transmitting channel switching response information to the wireless data transmission device.

17. The device of claim 11, wherein the process of switching to the new channel comprises a process of the communication unit transmitting information on the channel monitoring to the wireless data transmission device, a process of receiving channel switching request information from the wireless data transmission device, and a process of transmitting channel switching response information to the wireless data transmission device.

18. The device of claim 11, wherein the process of switching to the new channel comprises a process of receiving a first EDMG PPDU for selecting a modulation and coding scheme (MCS) in a first direction from the wireless data transmission device on a currently connected channel, a process of transmitting a second EDMG PPDU for selecting a MCS in a second direction to the wireless data transmission device on the currently connected channel, and a process of transmitting MCS information selected based on the first EDMG PPDU and information on the channel monitoring to the wireless data transmission device.

19. The device of claim 18, wherein the first EDMG PPDU and the second EDMG PPDU are null data and each comprise a training (TRN) field at an end thereof, and
- the communication unit performs beam maintenance based on the training field.

20. The device of claim 18, wherein the first EDMG PPDU and the second EDMG PPDU are received according to a wake-up period.

* * * * *